(12) United States Patent  
Rajkowski

(10) Patent No.: US 9,075,448 B2
(45) Date of Patent: Jul. 7, 2015

(54) SYMBOL ENCODING APPARATUS AND METHOD

(71) Applicant: Janusz Wiktor Rajkowski, Collingdale, PA (US)

(72) Inventor: Janusz Wiktor Rajkowski, Collingdale, PA (US)

( * ) Notice: Subject to any disclaimer, the term of this patent is extended or adjusted under 35 U.S.C. 154(b) by 269 days.

(21) Appl. No.: 13/845,045

(22) Filed: Mar. 17, 2013

(65) Prior Publication Data

US 2014/0266812 A1  Sep. 18, 2014

(51) Int. Cl.
*G06F 3/02* (2006.01)
*H01H 13/84* (2006.01)
*H01H 13/85* (2006.01)
*G06F 3/023* (2006.01)

(52) U.S. Cl.
CPC ............ *G06F 3/0234* (2013.01); *G06F 3/0202* (2013.01); *H01H 2217/006* (2013.01); *H01H 13/85* (2013.01); *H01H 13/84* (2013.01); *H01H 2217/018* (2013.01); *H01H 2217/024* (2013.01)

(58) Field of Classification Search
CPC ... G06F 3/0234; G06F 3/0202; G06F 3/0205; H01H 13/84; H01H 13/85; H01H 2223/03; H01H 223/032; H01H 2217/018; H01H 2223/034; H01H 2223/036; H01H 2223/0362
See application file for complete search history.

(56) References Cited

U.S. PATENT DOCUMENTS

| | | |
|---|---|---|
| 2,532,228 A | 11/1950 | Hesh |
| 3,022,878 A | 2/1962 | Seibel et al. |
| 3,633,724 A | 1/1972 | Samuel |
| 4,517,424 A | 5/1985 | Kroczynski |
| 4,520,240 A | 5/1985 | Swindler |
| 4,584,443 A | 4/1986 | Yaeger |
| 4,761,522 A | 8/1988 | Allen |
| 4,849,732 A | 7/1989 | Dolenc |
| 4,897,649 A | 1/1990 | Stucki |
| 4,917,516 A | 4/1990 | Retter |
| 5,087,910 A | 2/1992 | Guyot-Sionnest |
| 5,361,083 A | 11/1994 | Pollack |
| 5,486,058 A | 1/1996 | Allen |
| 5,552,782 A | 9/1996 | Horn |
| 5,583,497 A * | 12/1996 | Hankes ............... 341/22 |
| 5,743,666 A | 4/1998 | VanZeeland |
| 6,386,773 B1 | 5/2002 | Mathias |
| 6,456,278 B1 * | 9/2002 | Lee ............... 345/168 |
| 6,765,502 B2 | 7/2004 | Boldy et al. |
| 7,038,659 B2 | 5/2006 | Rajkowski |
| 7,674,053 B1 | 3/2010 | Davidson et al. |
| 7,790,972 B2 | 9/2010 | Stewart |
| 2004/0027333 A1 * | 2/2004 | Yasuda et al. .......... 345/168 |
| 2007/0040807 A1 | 2/2007 | Kleve |
| 2009/0058802 A1 * | 3/2009 | Orsley ............... 345/157 |
| 2010/0019940 A1 * | 1/2010 | Oh ............... 341/20 |
| 2011/0180376 A1 * | 7/2011 | Takewaka ............... 200/308 |
| 2011/0242064 A1 * | 10/2011 | Ono et al. ............... 345/184 |
| 2013/0207890 A1 * | 8/2013 | Young ............... 345/156 |

FOREIGN PATENT DOCUMENTS

JP  2003223829 A  *  8/2003  ............. H01H 13/14

* cited by examiner

*Primary Examiner* — Daniel J Colilla

(57) ABSTRACT

One hand operated device with the functionality of standard computer keyboard is provided. User encodes a symbol with a sweeping motion of a finger, "flicking" gently at one of plurality of touch sensitive actuators.

42 Claims, 24 Drawing Sheets

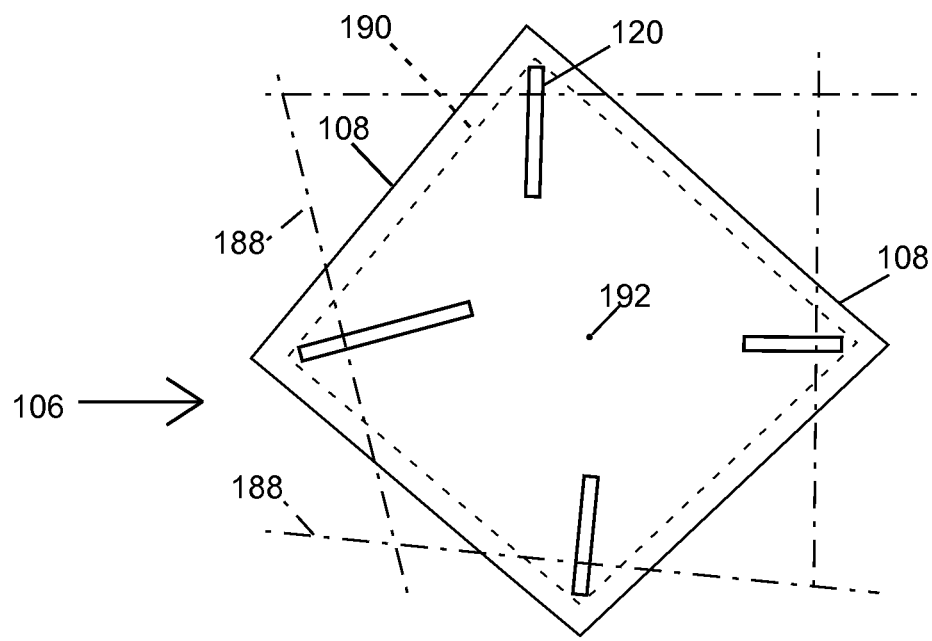
Fig. 20
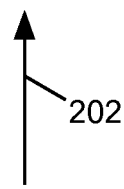
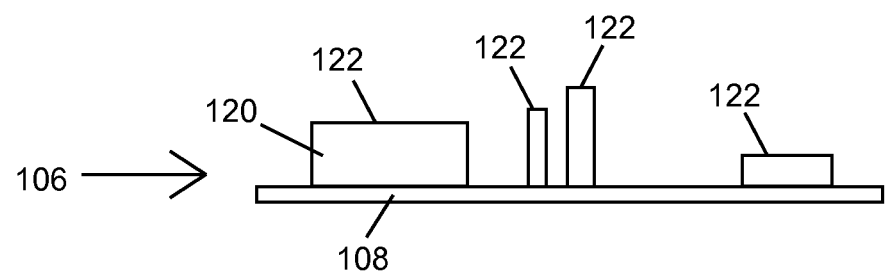
Fig. 21

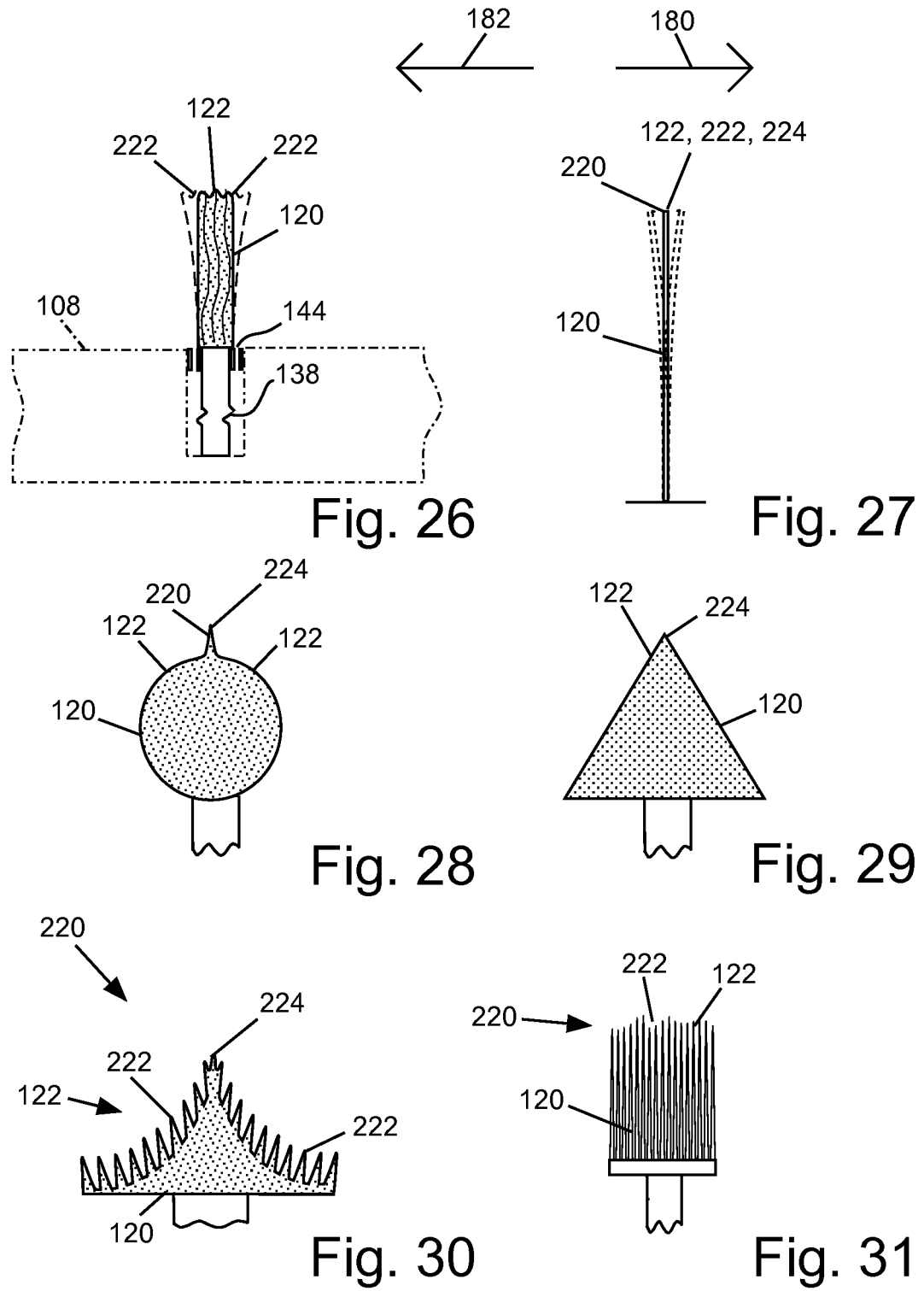

SYMBOL ENCODING APPARATUS AND METHOD

I. BACKGROUND OF THE INVENTION

A. Field of the Invention

The Invention is an apparatus for manually encoding symbols for input to a computer using the fingers of one hand. The Invention is also a method of encoding symbols using the apparatus.

B. Statement of the Related Art

As used herein, the term "computer" means any device that includes a microprocessor with access to computer memory and that can be configured to convert signals from the apparatus of the Invention to corresponding symbols. By way of example and without limitation, the term 'computer' includes a mainframe computer, a desktop computer, a laptop computer, a notebook computer, a netbook computer, a tablet computer, a distributed computing system, a smart phone, a personal digital assistant, an embedded system, and any other system having a microprocessor with access to computer memory.

The term 'data input device' means any apparatus that is capable of receiving an instruction manually from a human being and that is capable of communicating with the microprocessor. The term 'symbol' means all of the symbols or instructions that may be communicated by a keystroke on a conventional QWERTY computer keyboard or by a keystroke on any computer keyboard in any language, and capable of data entry.

The most widely utilized data input device is the familiar keyboard arranged according to the QWERTY layout. QWERTY and all derived keyboards are a holdover from the days of mechanical typewriters. QWERTY-type keyboards generally are configured for two-handed input, are operable from a seated position often while watching the typing fingers. Despite the continuing popularity of the QWERTY keyboard, creating an easy-to-use one-handed keyboard remains a constant goal of developers and innovators.

Prior art data input devices suitable for one-hand operation fall into a few general categories: chording keyboards, keyboards with clusters of small keys, and multi-axial switch keyboards.

A "chording" keyboard requires that the operator press two or more keys at a time to form a 'chord' encoding a single symbol. Chording keyboards allow one-handed touch-typing and have the advantage of simplicity of construction. Chording keyboards are difficult to learn and difficult to operate. Up to five keystrokes may be needed to encode a single symbol. The chording keyboard operator must undergo extensive training and must learn a complex set of relationships between characters and chords. Difficult combinations of finger presses make operation a challenge. Premature release or early operation of one of the keys in a combination, or an unwanted combination occurring during a transition, often results in unwanted entry. This problem worsens with increased speed of operation.

In contrast with the chording keyboard, a keyboard featuring a single-keystroke-per-symbol mode of operation is much simpler for the user to comprehend, learn and perform. There are problems in constructing a one-handed keyboard using single keystroke technology; namely, such a keyboard requires a large number of keys and those keys must fit in a small space. One way to fit many keys into a small space is to make the keys small. See, for example, U.S. Pat. No. 4,849,732 issued to Dolenc on Jun. 18, 1989, which teaches four clusters of small keys; each cluster of keys is within reach of a dedicated finger.

Still another proposal was to use multi-contact switches. Such an approach is disclosed in U.S. Pat. No. 2,532,228 to Hesh, issued Nov. 28, 1950. Another example is U.S. Pat. No. 4,584,443 to Yaeger issued Apr. 22, 1986, where each finger of both hands operates a dedicated key. Each key of Yaeger can encode several symbols by moving in different directions.

Keyboards with key clusters or with multifunctional keys have disadvantages. Manual discrimination and actuation by the operator of a single target key among many other small keys is difficult and requires hand motions that are un-ergonomic, deliberate, tense, and slow. Keyboard designed for one-handed operation typically use switches operated by a spring-loaded plunger. To operate such a switch requires a sequence of actions, for example, a vertical key-press, a stop, and a rise of a finger. Engaging in the sequence for each key press or switch actuation consumes the operator's time and effort.

Tablet computers and other hand-held devices such as smart phones substitute a virtual keyboard on a touch screen for a physical keyboard and mouse. Although this innovation makes the computer more portable, it is a costly compromise. A virtual keyboard on a touch screen can provide only basic functionality to the computer and is ill suited for input of large amounts of data.

In addition to the touch screens on tablets and smart phones, another computing apparatus slowly is coming into use; namely, a computer capable of projecting a detailed screen image to the eyes of the user from a head-mounted apparatus. Computers of this type are already in use in the military and by enthusiasts of mobile computing. Such computers have no screen that can be touched and the conventional two-handed keyboard is not suitable for the mobile applications for which such computers are best adapted.

The tactile sensation and feedback of a full size computer keyboard sets the standard against which all alternative keyboards are measured. The full-sized QWERTY keyboard allows for fast, powerful, "ballistic" punching strokes to the spring-loaded and often deeply yielding keys, providing excellent motion and tactile sensation. In contrast, smaller keyboards, such as used in calculators, employ micro switches that must be operated with slower, more deliberate strokes. The use of a small keyboard requires that the operator view the keys, and designers of such keyboards generally use keys having a spring-operated "snap-action" or "tipping-point" mechanism, to communicate contact closure to the user in the form of perceived "click." An additional function of the snap-action mechanism is to reduce contact bouncing. The need for the snap mechanism is an indication of inadequacy of sensation induced by the vertical stroke to the key. While the snap-action mechanism significantly enhances feedback, it also increases the spring tension and the actuator travel distance, effectively delaying the contact closure and slowing keyboard operation. Nevertheless, switches of this type prevail in keyboards designed for use by one hand.

A one-handed data entry device with the functionality of a QWERTY keyboard and that is portable, non-intrusive and easy to use is needed. Such a device was taught by U.S. Pat. No. 7,038,659 to Rajkowski, issued May 2, 2006, which is incorporated by reference as if set forth in full herein. The prior art does not teach the improved data input device of the invention.

II. BRIEF DESCRIPTION OF THE INVENTION

The invention is an 'input-key;' namely, a one-finger data input device to encode symbols into a computer. The invention is also a 'fence', an apparatus for orienting and guiding the user's finger. The invention is also a 'glance keypad;' namely, a one-handed data input device comprising a plurality of input-keys, such as four input-keys, with each input-key being assigned to a fingertip of a human hand and all of the input-keys being within simultaneous operative reach of the fingers of the hand. The invention is also a method of inputting data to a computer using the input-key or glance keypad.

Each input-key includes a base and a plurality of actuators, such as four actuators. Each actuator defines a touch location and each touch location is in a spaced-apart relation to the base above the base. The touch location is the area to be contacted by the fingertip performing a glancing touch. The touch locations for each input-key are located within the operative reach of the fingertip assigned to the input-key.

The term 'actuator' means an apparatus configured to detect a first glancing touch to the touch location defined by that actuator when the fingertip is moving in a first direction with respect to that actuator and also to detect a second glancing touch to the touch location when the fingertip is moving in a second direction with respect to that actuator. The first and second directions are generally opposite to each other. The actuator is configured to translate the detected glancing touch into a signal that can be interpreted by a computer. The computer will encode a first symbol from a set of symbols in response to the first glancing touch and encode a second symbol from the set of symbols in response to the second glancing touch.

The term "glancing touch" means a momentary touch or stroke by a fingertip of a user to the touch location of an actuator when the fingertip is moving in either the first direction or the second direction. A glancing touch preferably is part of a 'glancing motion;' namely, a continuous motion of the fingertip so that the fingertip is not slowed, stopped or otherwise obstructed by the glancing touch to the actuator.

A glancing touch to a touch location applies a momentary pulse of force to the touch location. The first glancing touch applies a first force to the touch location in the first direction. The second glancing touch applies a second force to the touch location in the second direction. The magnitude of the first and second forces exceeds the actuation sensitivity threshold of the actuator. The magnitude of the first and second forces, although low, is adequate to produce a corresponding deformation of the skin of the fingertip, stimulating nerve receptors, exceeding the minimum touch threshold of the user and generating a touch sensation in the fingertip. In short, the user can feel the glancing touch.

The actuation sensitivity threshold of each actuator is the minimal force applied to the touch location in the first direction or in the second direction necessary to encode a symbol to a computer. The actuation sensitivity threshold of each actuator is selected to be low enough so that the glancing touch does not slow, stop or impede the glancing motion of the fingertip in the first or second direction, but is selected to be high enough so that the user can feel the touch. Actuation sensitivity thresholds between 0.0005 and 5 newtons are believed to be suitable. In practice a range between 0.01 and 0.2 newtons has proven to be adequate. The actuation sensitivity threshold may be user selectable. The glancing touch provides tactile feedback to the user while not slowing the glancing motion of the fingertip of the user.

Each touch location of an input-key is a prominent target for the glancing motion and is tactilely distinct from the base and from the other touch locations of the input-key. The term 'tactilely distinct' means that the touch locations are configured so that each touch location can be distinguished one from the others by the user using the sense of touch. Actuators may be tactilely distinct due to differences in location of the actuators, due to difference in configuration or shape of the actuators, due to differences in surface texture of the actuators, or due to any other differences that allow the user to distinguish one actuator from another using the user's sense of touch. For example, the touch locations may be separated one from another so that a fingertip can actuate only one actuator at a time and each touch location may include a tactilely prominent feature such as a tactilely prominent ridge, a tactilely prominent pointed top or a texture to assist the user in perceiving the touch location with his or her fingertip. Because the human fingertip is exceptionally sensitive at discerning edges or textures, the user applying a glancing touch will perceive the tactilely prominent feature by touch, will determine that the intended glancing touch has occurred, and will infer that a symbol has been encoded. The user perceives the successful encoding of a symbol without the need for click-over switches or for the long stroke of a conventional keyboard or for observing a keyboard or a computer screen.

The actuator has two active states—a first active state when the actuator detects the first glancing touch to the touch location and a second active state when the actuator detects the second glancing touch to the touch location. The actuator may be in only one of the active states at any one time. The first active state encodes the first symbol from the set of symbols and the second active state encodes the second symbol. The actuator may detect the displacement, distortion of a material or change in the field of force, such as an electric charge, in response to the directional touch. The actuator may utilize any technology known in the art to detect the directional touch of the fingertip, including without limitation a sensor with mechanical contacts, a resistance sensor, a electric field sensor, magnetic field sensor, an acoustical sensor, a piezoelectric sensor, a strain sensor or electromagnetic radiation sensors.

Each input-key defines a perimeter that surrounds the touch locations of that input-key and a central location within the area of the perimeter. The 'perimeter' is a geometrical construct, and is defined by the line connecting outermost extent of touch locations in the input-key. The touch locations are distributed in a spaced-apart relation within the perimeter and distributed about the central location. The first and second directions for each touch location together generally define a line of actuation corresponding to the directions in which the first force and the second force are at a minimum to actuate the actuator. The lines of actuation in combination of each input-key may define a polygon in plan view when viewed from above along a line generally orthogonal to the base. Where the input-key has four actuators, the perimeter may be of a square, trapezoid, rhombus or diamond shape, or other convex quadrilateral shape. Any number of actuators per input-key other than four also is contemplated by the invention. Where the input-key includes fewer than three actuators, the lines of actuation of the input-key cannot define a polygon. Other orientations of the lines of actuation are also contemplated by the invention. For example, the lines of actuation of four actuators may be generally parallel, may define a an 'X' shape, or a 'U' shape.

Each input-key may feature a fence about the perimeter of the input-key and supported above the base to provide tactile feedback as to the location of the user's finger with respect to the input-key and hence with respect to the touch locations. The input-key is operated by moving-and-touching the target actuators in a rapid, automatic glancing motion by the fingertip. The flexible, resilient fence provides feedback to the user as to the location of his or her finger without interfering with the glancing motion of the fingers. The fence is raised above the base to allow contact between the fence wall and the user's finger, informing the user about where the user's finger is located with respect to the input-key and without requiring the user to look at his or her finger or the input-key.

During operation of a glance keypad and when the finger is not engaged in making a glancing touch, the finger remains in the vicinity of, and above the touch locations of the input-key, but is not required to remain in any particular idle position. For a glance keypad having more than one input-key and with each input-key having a fence, touching any fence at any location and with any finger provides feedback to the user and allows the user to maintain proper position and distance between the fingertip and the touch locations of the actuators.

The fence is composed of a resilient material, such as fabric, rubber, plastic, metal, bristles, or any other suitable material. The fence may feature one or more slits to facilitate insertion or removal of the user's finger. The resilient fence is resistant to deformation in compression, defined as deformation generally normal to the base and is resistant to deformation in flexion, i.e. stretching, defined as deformation generally parallel to the base. The resistance to deformation in compression may be the same or greater than the resistance to deformation in flexion. The fence has a side wall featuring an inner surface and a top edge, and may include features to promote tactile feedback to the user, such as inward-facing projections on the inner surface. The finger pushing against the side wall and stretching the fence at the location of contact with the fence, and may in even bend the whole fence structure in the direction of push.

The plurality of input-keys are located together on a body to define the glance keypad, with each of the input-keys being disposed on the body so that one finger of one hand can be assigned to each input-key and all of the input-keys are in simultaneous operative reach of the assigned fingers. The term 'simultaneous operative reach' means that the input-keys are located on the body of the glance keypad in such a configuration and in such proximity that all actuators can be actuated by the user without moving the user's forearm. The body of the glance keypad and the base of each input-key may be one and the same.

In practice, use of four actuators per input-key with the lines of actuation of each actuator defining a rectangle in plan view has proven suitable. The rectangular configuration of actuators is operated by clockwise and counterclockwise motions of the user's fingertips, i.e. some actuators are actuated by left-right motions of the fingers and others by flexion-extension motions of the fingers. In practice, use of four input-keys for a glance keypad with each input-key assigned to a one of the user's fingers has proven suitable.

For an input-key having four actuators, the perimeter of the input-key may be in the shape of a rhombus or diamond shape. Each diamond-shaped perimeter has four corners, with two opposing corners being oriented along a longitudinal axis generally aligned with the user's forearm when the glance keypad is in use and with two corners being oriented generally transverse to the longitudinal axis. The two opposing corners transverse to the longitudinal axis define the width of the input-key. To achieve an adequately narrow glance keypad, the four input-keys are located in a staggered arrangement so that the width of all of the input-keys in combination is less than the sum of the widths of the individual input-keys.

The glance keypad may include features to increase the available number of symbols that may be encoded. The number of symbols that may be encoded by an input-key is defined by the number of actuators of that input-key. With each actuator having two active states, each actuator is capable of encoding two symbols. An input-key having four actuators therefore can encode eight different symbols. An input-key can be assigned more than one set of symbols, as by pressing a set selection key using the operator's thumb. Any other way of set selection known in the art is contemplated by the invention, such as using a motion by the heel of hand, by manipulating a cursor using a screen navigation device, or a by typing in a command. The glance keypad may be provided with a cluster of switching devices, such as pushbuttons, to allow operations by the user's thumb, such as selecting sets of symbols for the input-keys.

The glance keypad also may include a screen navigation device, such as a touchpad. The touch pad may be inclined in relation to the plurality of input-keys to allow easy access to the touchpad by the user.

One or more aspects of the invention offer advantages over the prior art. The gentle 'glancing motion' requires a fraction of the force applied to a conventional keyboard and over a shorter range of motion. The user's finger touches the actuator only momentarily, reducing the time required for entry of a symbol. The input-key and glance keypad are designed to guide finger movements, provide easy target for glancing touches, and assure reliable sensory feedback so that the input-key and glance keypad can be operated with swift automatic motions. The apparatus and method can be configured to utilize common and inexpensive technologies to manufacture, can be configured to be easy to operate, and can provide an intuitive and practical learning tool for the glancing method.

III. BRIEF DESCRIPTION OF THE DRAWINGS

FIG. 20 is a schematic plan view of an input-key with an irregular quadrilateral-shaped perimeter.

FIG. 21 is a side view of the input-key of FIG. 20 with actuators varying in height and length.

FIG. 26 is an end view of a displacement detector having a flexible actuator.

FIG. 27 is an end view of a blade-shaped actuator.

FIG. 28 is an end view of an actuator having a single ridge.

FIG. 29 is an end view of an actuator having a triangular profile.

FIG. 30 is an end view of an actuator having multiple edges.

FIG. 31 is an end view of an actuator having bristles.

IV. DESCRIPTION OF AN EMBODIMENT

Figure 1:
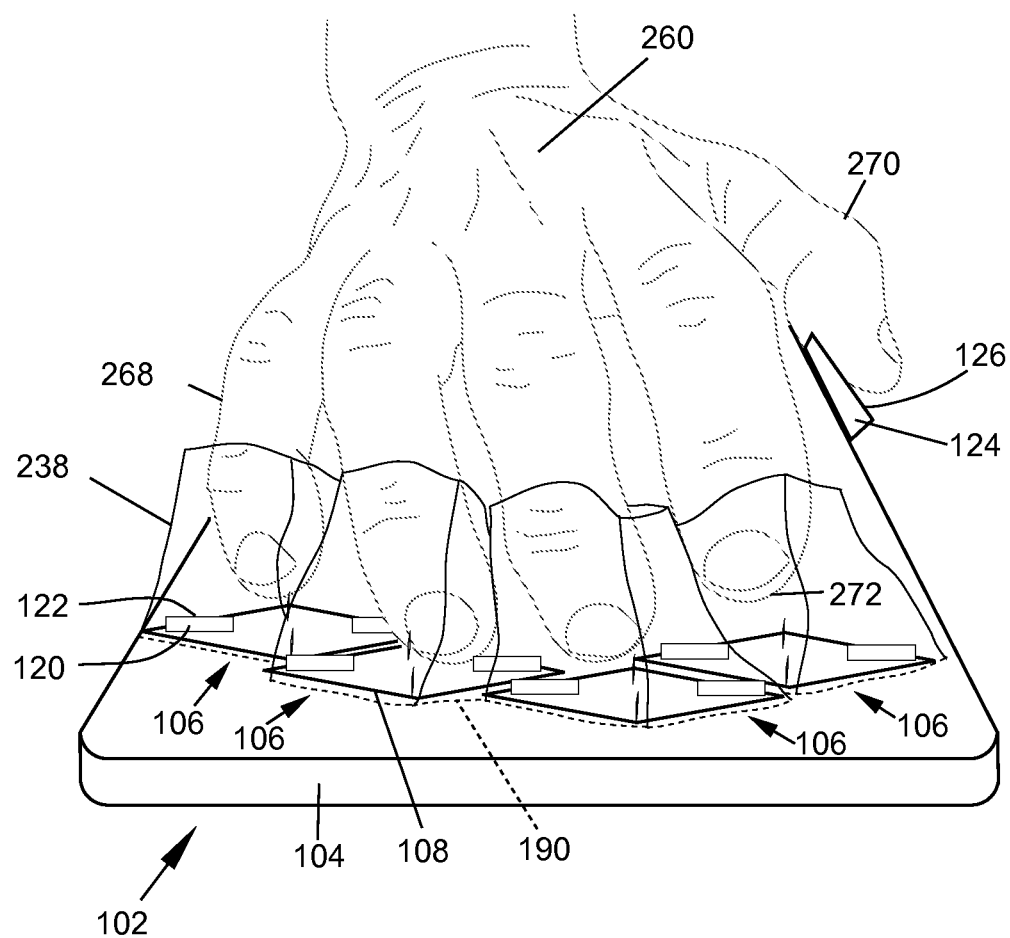
FIG. 1 shows a front view of the glance keypad with a user's hand in position to operate the glance keypad.

FIG. 1 illustrates a glance keypad. The glance keypad 102 is configured be operably connected to a computer 114, as in FIG. 60, and to encode a symbol selected from a set of symbols in response to a glancing touch, as defined above, by a fingertip 272 of the user. The glance keypad 102 of FIG. 1 includes a body 104 and four input-keys 106 supported on the body 104. The glance keypad 102 alternatively can be configured with less than four or more than four input-keys 106. Each of the input-keys 106 is configured to receive and engage one finger 268 of a human hand 260. Each input-key 106 includes a base 108 that may be the size of the perimeter 190, or larger, and a plurality of actuators 120. The base 108 of the input-key 106 and the body 104 of the glance keypad 102 may be one and the same. Each of the actuators 120 defines a touch location 122. A fence 238, illustrated as transparent on FIG. 1, is disposed about the perimeter 190 of each input-key 106 and engages the finger assigned to that input-key to provide tactile feedback to the user as to the location of the user's finger 268 with respect to the touch locations 122 of the input-key 106. The glance keypad 102 may include a thumb pad 124 holding a cluster of switching devices 126 and configured to be engaged by the user's thumb 270. The cluster of switching devices 126 allows the user to select among different sets of symbols for encoding by the glance keypad 102 using the user's thumb 270.

As an example, the user may employ the user's thumb 270 to activate the cluster of switching devices 126 to configure the glance keypad 102 to encode a set of symbols comprising the lowercase letters of the Roman alphabet, or a set of upper case letters, or a set of punctuation. The cluster of switching devices 126 may be configured to select any other set of symbols or set of characters that a user may wish to encode. As a result, the user enjoys the functionality of a conventional keyboard in a compact form that can be operated by one hand.

Figure 2:
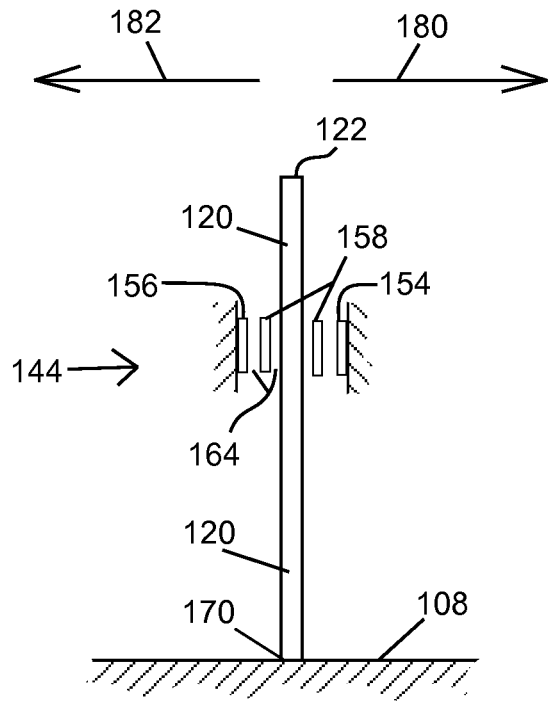
FIG. 2 is a schematic diagram of an actuator in the normally open position.
Figure 3:
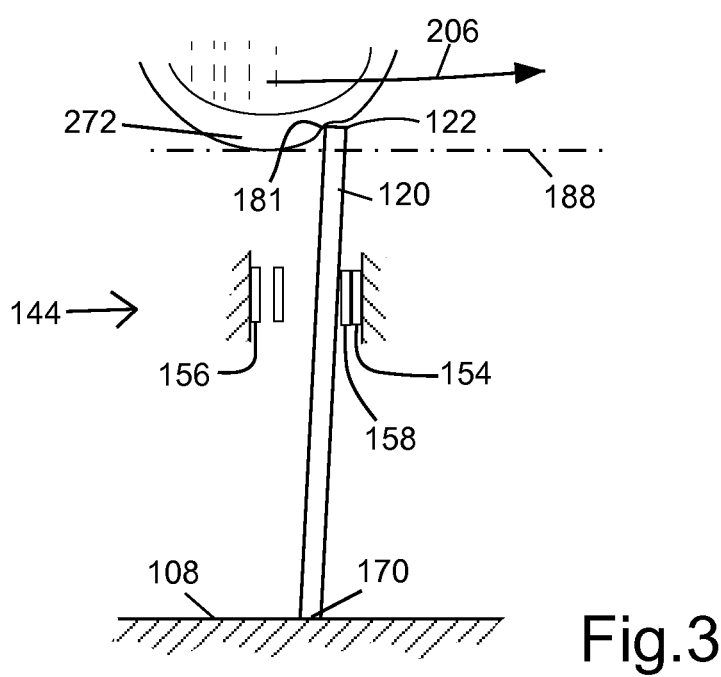
FIG. 3 is a schematic diagram of an actuator moved to a first active state by a first glancing touch.

FIGS. 2 and 3 are schematic diagrams of an actuator 120 configured as a sensor with mechanical contacts (also referred to as 'mechanical switch') 144 having two active states, i.e. the switch actuation generates a first signal in response to a first actuating touch, and a second signal in response to a second actuating touch. The actuator 120 defines a touch location 122 and a base 108. The touch location 122 is in a spaced-apart relation to the base 108 above the base by for example 10 mm. The mechanical switch 144 includes first stationary contact 154 and a second stationary contact 156 that are configured not to move with respect to the base, and movable contacts 158 that are configured to move with respect to the base 108 in response to a glancing touch to the touch location 122. The actuator 120, and hence the movable contacts 158, can move in either a first direction 180 or a second direction 182, as shown by FIG. 2. Motion in the first direction 180 will cause the movable contact 158 to make contact with the first stationary contact 154 and will trigger the first active state of the actuator. Motion in the second direction 182 will cause the movable contact 158 to make contact with the second stationary contact 156 and will trigger the second active state of the actuator. The first direction 180 and second directions 182 are generally opposite to one another and generally define a line of actuation 188 of the actuator 120, as shown by FIG. 3. The line of actuation 188 is the line along which the first and second forces required to activate the first and second states of the actuator 120 are at a minimum.

In the embodiment of FIG. 2, the mechanical switch 144 defined by the actuator 120 is in the normally neutral position and is not in an active state. The actuator 120 of FIG. 2 is not encoding a signal.

FIG. 3 illustrates the same actuator as FIG. 2 with a fingertip 272 of the user making a first glancing touch 181 to the touch location 122 of the actuator 120 in the first direction 180, applying the first force to the actuator 120. The actuator 120 being attached to the base 108 may bend, hinge or pivot in two directions at a pivot mount 170 to the base 108. The actuator 120 deforms in response to the first force by moving about a pivot 170, and the movable contact 158 touches the first stationary contact 154, completing a circuit. If the glance keypad is operably attached to a computer, the touch of the movable contact 158 and the stationary contact 154 triggers the first active state. The computer will encode a symbol corresponding to the selected actuator 120 and to the first direction 180.

In a manner identical to that shown by FIG. 3, a second glancing touch (not illustrated) to the touch location 122 in the second direction 182 applies a second force to the actuator 120. The second force deforms the actuator 120 and causes the movable contact 158 to touch the second stationary contact 156, completing a circuit and triggering the second active state. If the actuator 120 is operably attached to a computer, the computer will encode a symbol corresponding to the selected actuator 120 and to the second direction 182.

Figure 4:
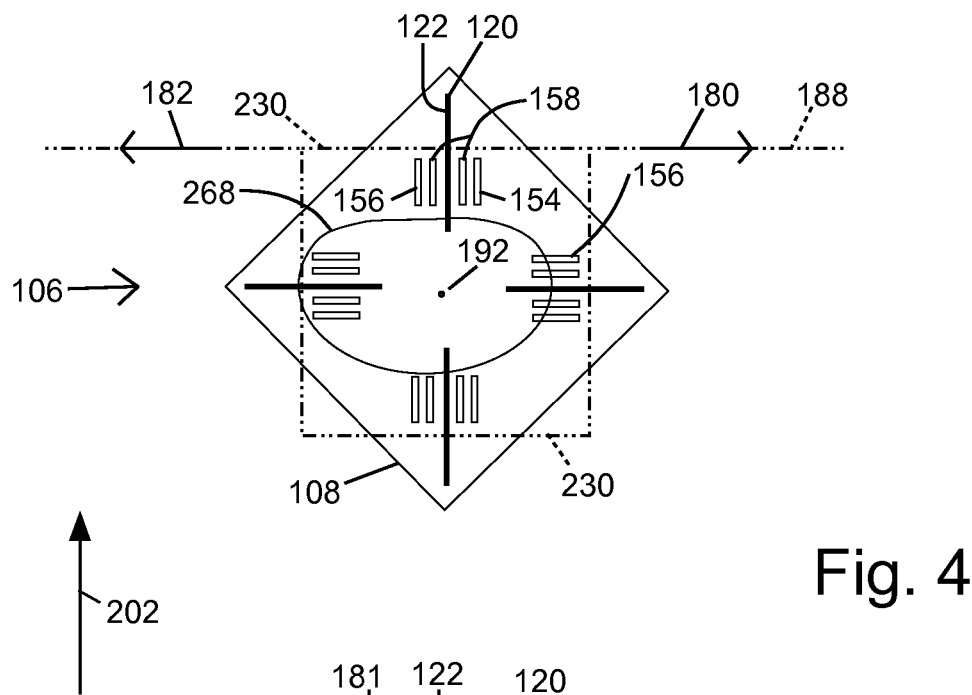
FIG. 4 is a schematic plan view of an input-key with all actuators in the normally open position.
Figure 5:
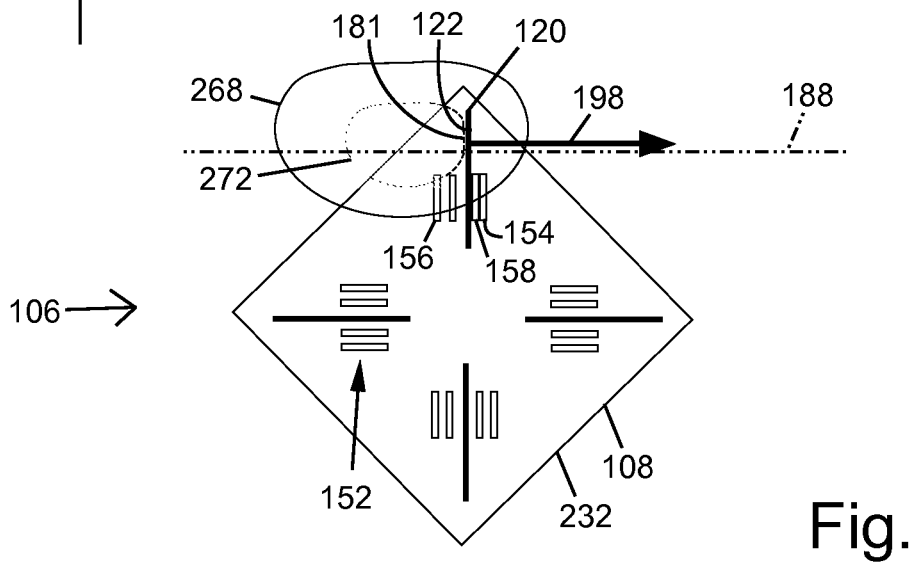
FIG. 5 is a schematic plan view of an input-key with an actuator moved to the first active state by a first glancing touch.

FIGS. 4 and 5 are schematic plan views of one configuration of an input-key 106. In FIGS. 4 and 5, the input-key 106 is viewed from above along a line generally orthogonal to the base 108. In the embodiment of FIGS. 4 and 5, the lines of actuation 188 of the actuators 120 in combination define a polygon 230 (drawn in phantom lines) in plan view, in this instance a rectangle. In the input-key configuration of FIGS. 4 and 5, the touch locations 122 of the actuators 120, having elongated narrow shape, are radially oriented about a central location 192. The touch locations 122 are oriented normal (orthogonal) to the lines of actuation 188 of the actuators 120. FIG. 4 corresponds to FIG. 2, with the four actuators 120 in neither the first nor second active state, with the movable contact 158 not in contact with either the first 154 or second stationary contact 156.

FIG. 5 corresponds to FIG. 3, with a fingertip 272 applying a first glancing touch 181 to the touch location 122 of an actuator 120. The direction of the first glancing touch 181 is not necessarily along the line of actuation 188; nonetheless, the first glancing touch 181 exerts the force in the first direction shown as touch-force vector 198 and deflects the actuator 120 until the movable contact 158 engages the first stationary contact 154. The actuator 120 is illustrated by FIG. 5 as in the first active state. If the input-key 106 is operably connected to a computer, the input-key 106 will encode a symbol associated with the actuator and with the first active state from among a set of symbols.

FIGS. 6 through 9 illustrate that actuators 120 can be defined by the technologies that are utilized for detection of the first 181 and the second glancing touch to the touch locations 122 of the actuators 120. Those technologies may be broken into three broad groups of detectors detecting force applied to the touch location 122: displacement detectors 128, shown by FIG. 6, distortion detectors 130, shown by FIGS. 7 and 8, and surface-touch detectors 132, shown by FIG. 9.

Displacement detectors detect the physical movement of the actuator 120 with respect to the detector 128. In the mechanical switch 144 example of FIGS. 2 through 5, displacement of the actuator 120 is detected by the physical touch of the movable 158 and stationary contact 154 completing a circuit. An actuator using displacement technology does not have to operate contacts. Any technology to detect the displacement of the actuator known in the art may be employed. Examples of displacement detectors comprise switches with resistance sensors 145, capacitive sensors 146, acoustical sensors 147, piezoelectric sensors 148, inductance sensors, 149, magnetic sensors 150, optical switches using reflected light, or having a light-obstructing path between a photo detector and the light source.

Figure 7:
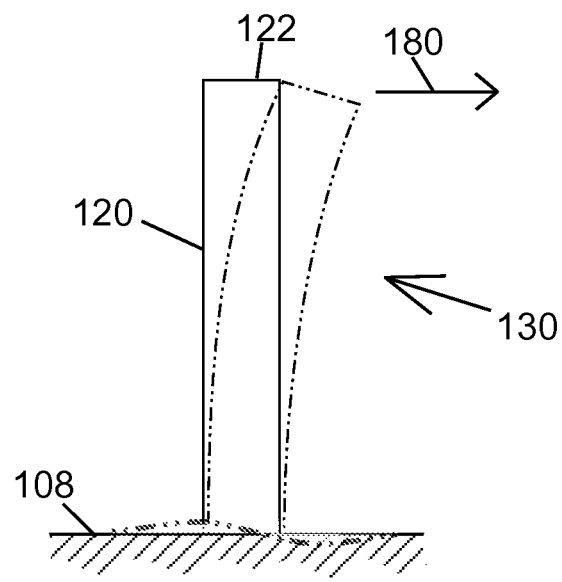
FIG. 7 is a schematic side view of a distortion detector actuator.
Figure 8:
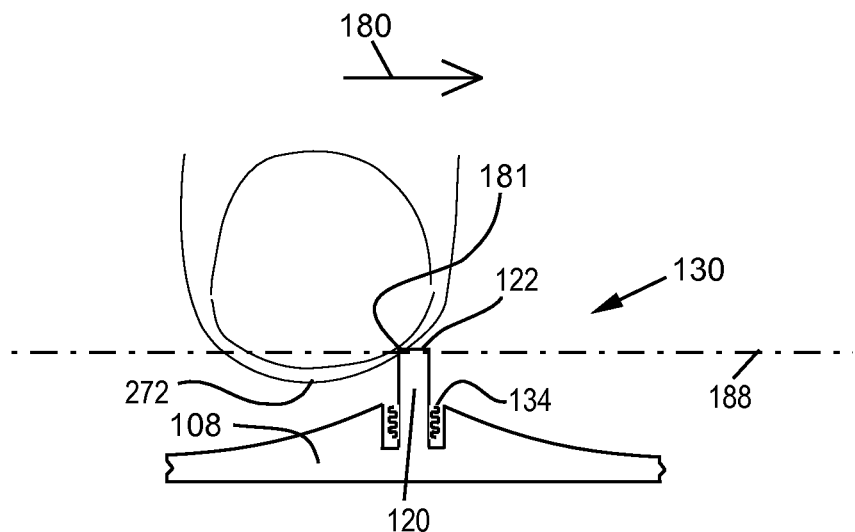
FIG. 8 is a schematic side view of a strain gauge actuator.

Actuators equipped with distortion detectors 130, shown by FIGS. 7 and 8, detect the elastic distortion (deformation, strain) of either the actuator 120 or the base 108 to which the actuator 120 is attached. Such distortion often is small in range, and while the operator can perceive the touch to the distortion detector, the operator may be unable to perceive a motion by the distortion detector in response to the touch. The distortion detector 130 may detect distortion of the actuator 120 using any strain-detecting technology known in the art, such as using resistive, capacitive and semi-conductive sensors. FIG. 7 shows an actuator 120 using distortion detector 130 with an undistorted actuator 120 in solid lines and the actuator distorted by a glancing touch and in the first active state in dashed lines. The actuator depiction on FIG. 7 does not specify the position on the actuator 120, or the technology of the sensor. The sensor may be disposed in any position where stretch or compression of the material forming the actuator will occur in response to the glancing touch. FIG. 8 discloses an actuator using distortion detector 130 with one or more strain gauge sensors 134 detecting the distortion of the actuator 120 in response to a first glancing touch 181 by a fingertip 272 along the line of actuation 188. When the force applied to the touch location 122 along the line of actuation 188 is above actuator's sensitivity threshold, the strain sensor 134 of FIG. 8 'infers' that a glancing touch has occurred and 'instructs' the computer to which the actuator 120 is operably attached to encode the symbol corresponding to the actuator and the direction of the glancing touch. Signals from sensors may require further processing, such as amplifying, filtering and debouncing the signals, as by a Schmitt trigger.

Figure 9:
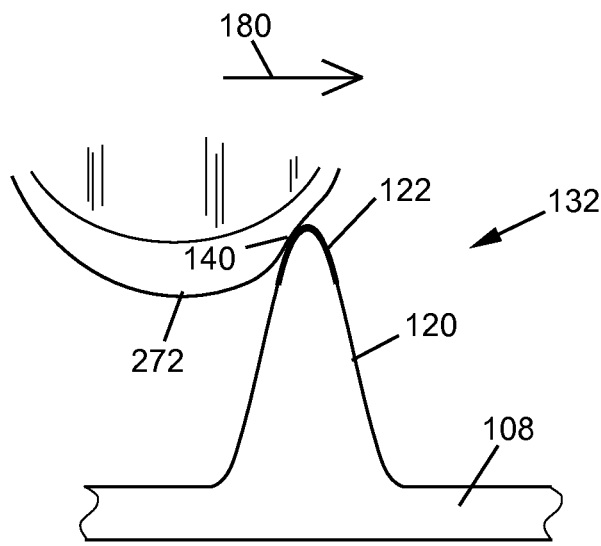
FIG. 9 is a schematic detail sectional view of a surface-touch actuator.

As shown by FIG. 9, the actuator may be using surface-touch detector 132 to detect the glancing touch. Surface-touch technology does not depend on distortion or displacement of the actuator. The surface-touch detector may use any technology known in the art to detect a touch to the touch location 122, such as resistive, surface acoustic wave, capacitive, electrostatic, inductance, infrared grid, infrared projection, optical imaging, dispersive signal technology, acoustic pulse recognition and any other touch-detecting technology. The touch-sensitive actuator 120 may 'infer' the force applied by the fingertip 272 in the first or second directions by detecting the location of the glancing touch within the touch location 122 area, and by detecting the change in the area contacted during the glancing touch. The touch-sensitive actuator thus 'infers' the deformation 140 of the fingertip 272 as the fingertip makes a glancing touch and hence the force applied by the fingertip 272 to the touch location 122 of the touch detector 132. If the area of touch is consistent with the first direction 180 or second direction 182 and the force exceeds actuation sensitivity threshold for the actuator 120, and if the actuator 120 is operably connected to a computer, then the computer concludes that a glancing touch has occurred and encodes a symbol assigned to the detector and to the direction of the touch.

Any kind and any combination of touch force detecting technologies beyond the mentioned above examples may be used for the actuator of the input-key.

Figure 6:
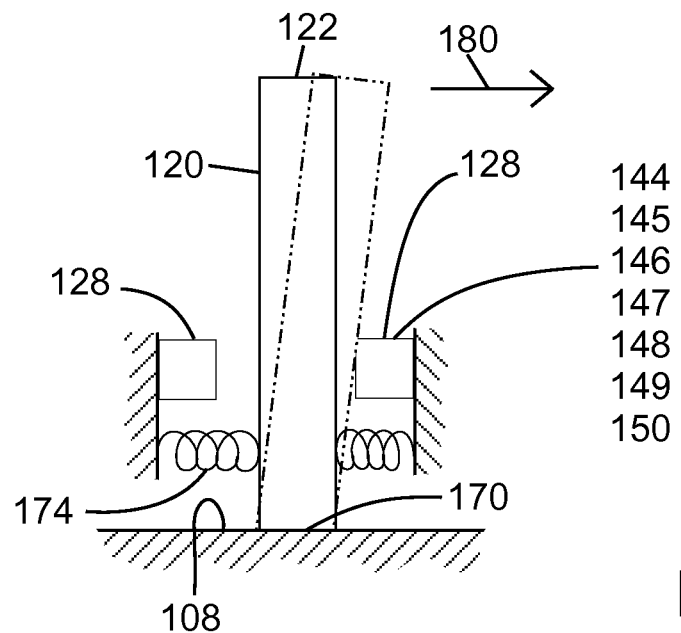
FIG. 6 is a schematic side view of a displacement detector actuator.

A displacement detector 128, distortion detector 130 or surface-touch detector 132 may include features to select the actuation sensitivity threshold of the actuator. The 'actuation sensitivity threshold' is a minimal force that must be applied to the touch location 122 for the actuator to detect the glancing touch. As shown by FIG. 6, the apparatus for a displacement detector to determine the actuation sensitivity threshold may be a spring 174, may be defined by the stiffness of the actuator 120 itself, and may be any other apparatus known in the art. The actuation sensitivity threshold is selected so that the actuating force of touch exceed the minimum touch perception threshold (also referred to as 'minimum touch threshold') of the user; so that the first and second forces are great enough that the user will feel the glancing touch. The actuation sensitivity threshold also is selected so that it is not so large as to slow or hinder the glancing motion of the user's fingertip. The actuation sensitivity threshold is selected also to be high enough so that shakes, bumps, and puffs of air do not trigger actuation. The actuation sensitivity threshold may be user selectable. An actuation sensitivity threshold of between 0.0005 and 5 newtons is believed to be suitable. In practice, an actuation sensitivity threshold of between 0.01 and 0.2 newtons has proven to be adequate.

For a mechanical switch 144, another factor affecting switch performance is the distance that the actuator must travel before the electrical contact is established. For example the width of the gap 164 separating the electrical contacts as in FIG. 2 may be configured to be adjustable. The gap induced delay between the start of the glancing motion and the switch actuation, together with spring preload may be selected by the user to allow the actuation and touch sensation associated with actuation to deliver a more reliable feedback. Adjustment of the tension and gap 164 allows the user to select sensitivity of glancing touches that are between feather-soft to firm, as felt by the fingertip. The user may prefer to apply a stronger or lighter force to the actuator to encode a symbol. At different levels of proficiency the user may prefer different actuator 120 settings. For example, a beginner may prefer an actuator with more tension; that is, a stronger spring preload to deliver a stronger touch sensation and to provide resistance to undesired forces. As the user becomes more proficient, the user's motions become faster, more precise and apply less force. The user's preference likely will shift toward actuators 120 that are more sensitive to touch. To compensate for sensory deficiency; for example, on occasions when the user's hands are tired or cold, the user may choose to increase the gap 164 and increase the spring preload, making such input-key 106 less sensitive to touches. Electronically controlled actuators can be configured to have touch characteristics, corresponding to spring preload and gap of a mechanical switch.

Figure 10:
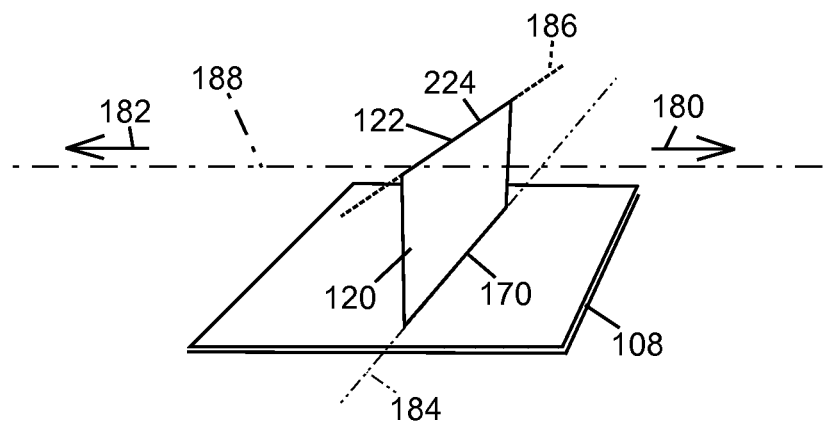
FIG. 10 is a schematic perspective view of an actuator.
Figure 11:
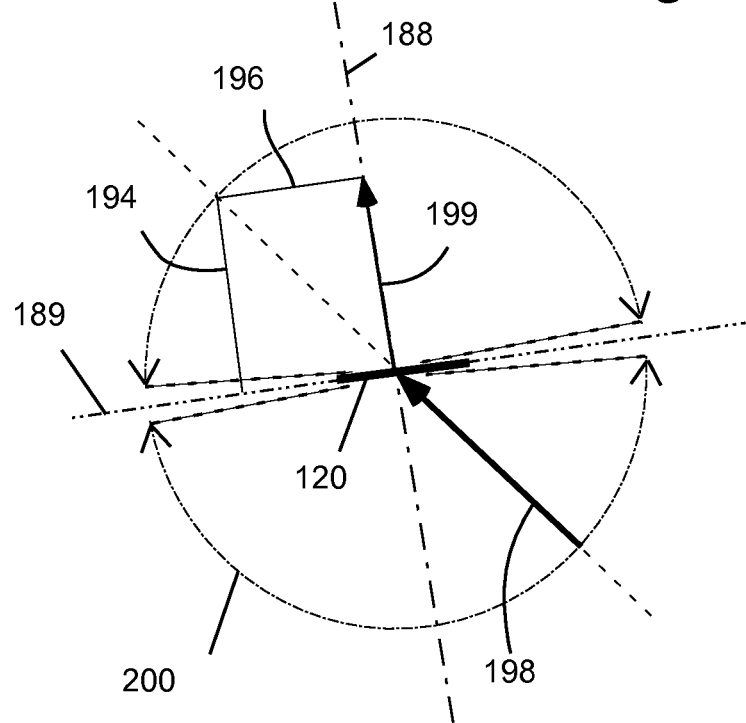
FIG. 11 is a schematic plan view of an actuator illustrating angles of effective touch.

FIGS. 10 and 11 show that the glancing touch is not required to be applied to the touch location 122 along the line of actuation 188. FIG. 10 illustrates a schematic perspective view of an actuator 120 of the displacement detector 128, similar to the actuator illustrated by FIGS. 2, 3 and 6. The touch location 122 is an elongated, narrow ridge 224, and the ridge 224 defines the ridge line 186. The hinge or pivot mount 170 attaches the actuator to the base and defines a pivot line 184. The hinge or pivot mount 170 holds an actuator 120 at a fixed position in relation to the top plane of the base 108, so that in response to touch in any direction the actuator 120, the actuator can incline only in one of the two directions. Although distortion detectors 130 do not pivot in a literal sense, a flexible distortion detector 130 fixedly attached to the base 108 will also deform or bend in two directions, with each direction transverse to the line of attachment with the base 108, imitating the tilt of the actuator with the pivot mount 170. The pivot line 184 and the ridge line 186 are normal to the line of actuation 188, and the actuator 120 can only move in the first 180 or second directions 182 along the line of actuation 188.

FIG. 11 illustrates a familiar vector diagram of the first force or second force when the touch-force vector 198 applied by the fingertip is not aligned with the line of actuation 188. The force 198 has a force component 194 along the line of actuation 188, and a force component normal to the line of actuation 196. When the force component along the line of actuation 194 exceeds the actuation sensitivity threshold of the actuator, the actuator will detect the touch and, if the actuator is operably connected to a computer, encode a symbol in response to the touch. A glancing touch may be applied to the actuator 120 at an angle of effective touch 200 close to 90 degree from the line of actuation and still be detected by the actuator 120. This consideration implies that an actuator will lose sensitivity the closer the angle of touch approaches the 90 degree limit, and have the highest sensitivity to touch along the line of actuation 188. The above consideration applies to distortion detectors 130 as well.

Figure 12:
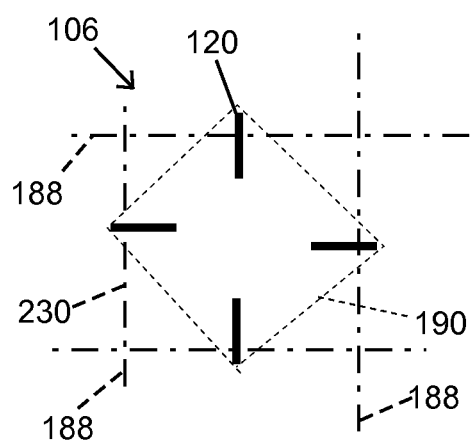
FIG. 12 is a schematic top view of an input-key with lines of actuation defining a rectangle.
Figure 13:
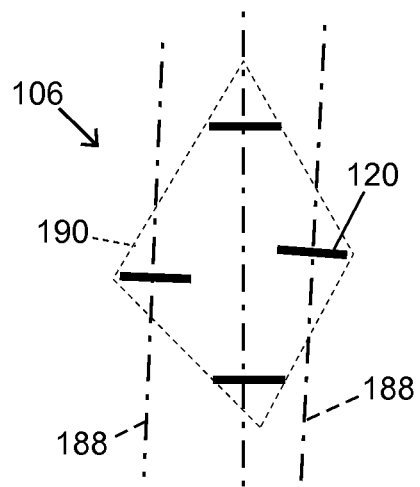
FIG. 13 is a schematic plan view of an input-key having parallel lines of actuation.
Figure 14:
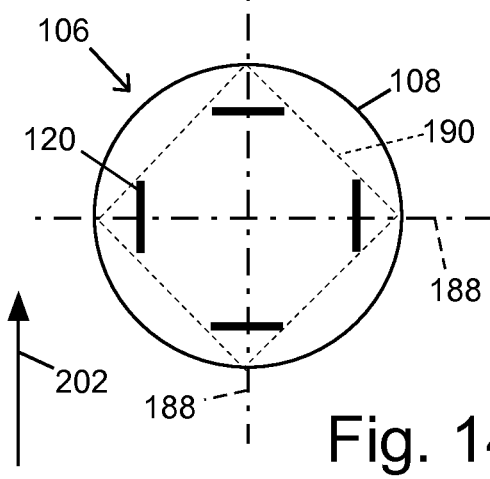
FIG. 14 is a schematic plan view of an input-key having lines of actuation defining an 'X' shape, with circular base.
Figure 15:
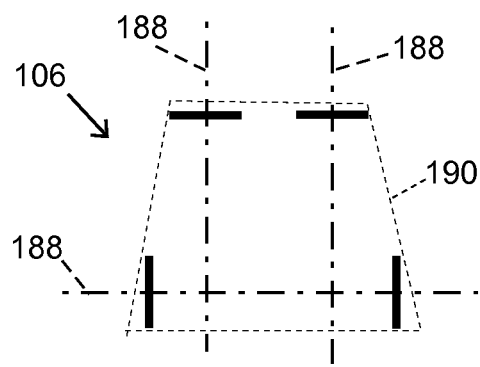
FIG. 15 is a schematic plan view of an input-key having lines of actuation defining an 'U' shape.
Figure 16:
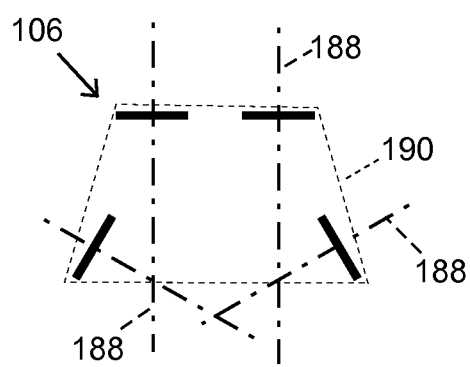
FIG. 16 is a schematic plan view of an input-key having lines of actuation defining an 'V' shape.
Figure 17:
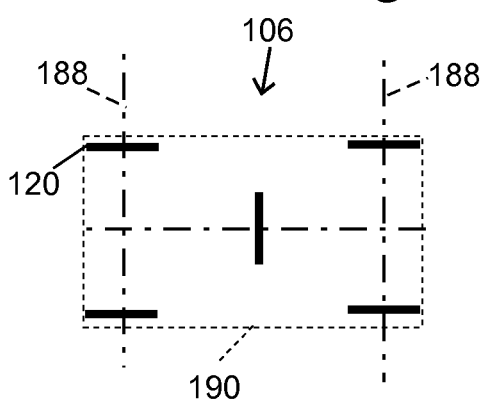
FIG. 17 is a schematic plan view of an input-key with five actuators having lines of actuation defining an 'H' shape.

FIGS. 12 and 13 illustrate that while the lines of actuation 188 of an input-key 106 may define a polygon 230, but are not required to define a polygon. In FIG. 12, the lines of actuation 188 define a polygon 230, in this case a rectangle. For the input-key 106 of FIG. 12, a combination of finger extensions and flexions and lateral sweeps of the fingertip are required to activate all four actuators 120 in both the first 180 and second 182 directions. The indicated finger extension direction 202 defines the orientation of the input-key 106 with the user's hand when the input-key is in use, with the direction of finger extension 202 being the direction that the user's finger will move when the user extends the user's finger. In FIG. 13, the lines of actuation 188 of four actuators 120 of the input-key 106 are parallel and thus do not define a polygon. The term 'parallel' is defined as 'extending generally in the same direction', which is illustrated by the slightly skewed 'parallel' lines of actuation 188 on FIG. 13. Although these lines of actuation 188 will intersect at some distance, for all practical purposes these lines are best described as parallel. In the input-key 106 of FIG. 13, only finger extensions (shown by arrow 202) and contractions are required to activate all four actuators 120. Any other orientation of the actuators 120 also is contemplated by the invention, including an input-key 106 having actuators 120 with lines of actuation 188 that are oblique one to another and that do not form a polygon. Examples are input-keys for which the lines of actuation 188 of the actuators define an 'X' shape, FIG. 14, a 'U' shape, FIG. 15, or a 'V' shape, FIG. 16. FIG. 17 shows a flick key with five actuators and three lines of actuation defining an 'H' shape. In addition FIG. 14 illustrates that shape of the base 108 of the input-key 106, a circle, may differ from the shape of the perimeter 190 of the input-key, a rhombus.

Figure 18:
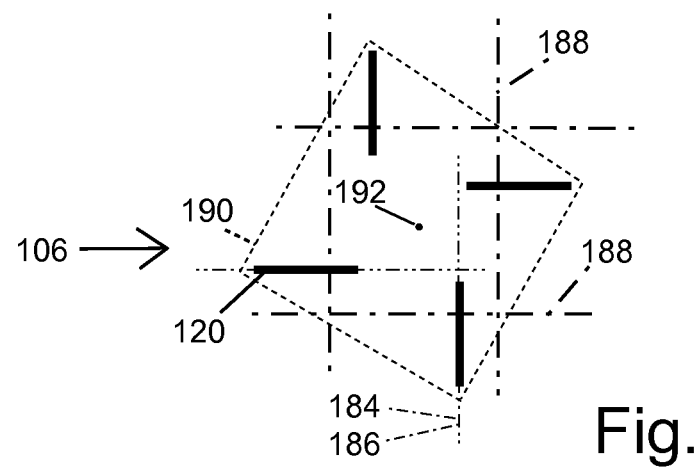
FIG. 18 is a schematic plan view of an input-key with a quadrilateral-shaped perimeter.
Figure 19:
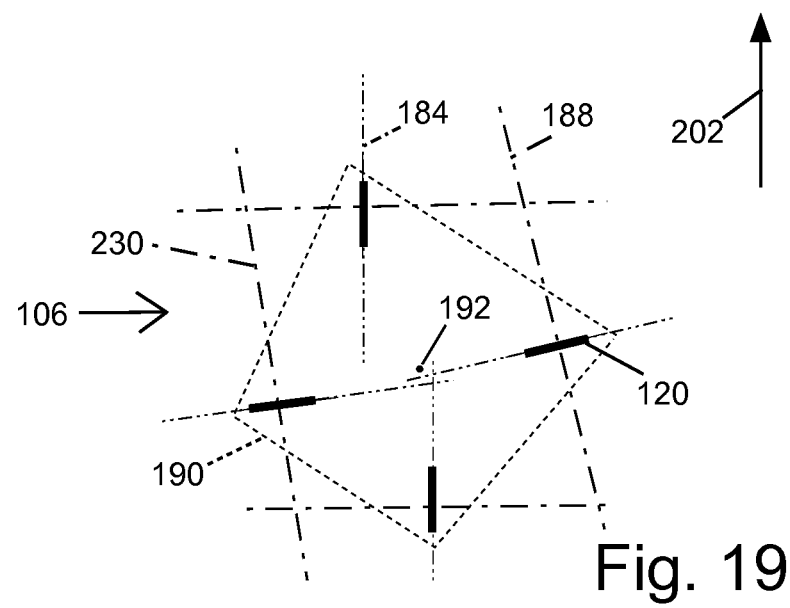
FIG. 19 is a schematic plan view of an input-key with a quadrilateral-shaped perimeter with irregularly disposed actuators.

FIGS. 18 and 19 illustrate that many different orientations of the actuators 120 are possible for the input-key 106. The lines of actuation 188 for the input-key 106 of FIG. 18 define a rectangle, however, the pivot lines 184 and the ridge lines 186 defined by the actuators 120 (see FIG. 10) do not intersect in the center 192 of the input-key 106. FIG. 19 illustrates that where the lines of actuation define a polygon 230, the polygon 230 is not necessarily a regular polygon. In the case of FIG. 19, the perimeter 190 is an irregular quadrilateral. As illustrated by FIGS. 12 through 19, any possible arrangement of the actuators on the base of the input-key is contemplated by the invention.

FIGS. 20 through 25 illustrate that the touch locations 122 of the actuators 120 of an input-key 106 can be configured in many sizes, forms and shapes. FIGS. 20 and 21 illustrate that the touch locations of the actuators do not necessarily fall on the same plane. FIG. 20 is a plan view of an input-key in which the lines of actuation 188 define an irregular quadrilateral in plan when viewed from above along a line generally normal to the base 108. The actuators 120 differ in length and are skewed in an irregular way. FIG. 21 is a side view of the same input-key as FIG. 20. FIG. 21 reveals additionally that the touch locations 122 of the actuators 120 are at different elevations above the base 108. Any elevation of the touch locations 122 above the base is contemplated by the invention, including touch locations that fall on the same elevation above the base, and touch locations that are at different elevations.

Figure 22:
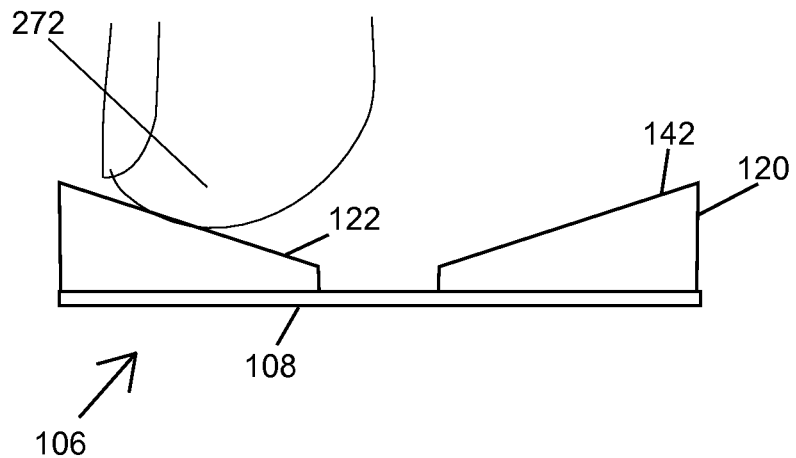
FIG. 22 is side view of an input-key with wire actuators having sloping touch locations.
Figure 23:
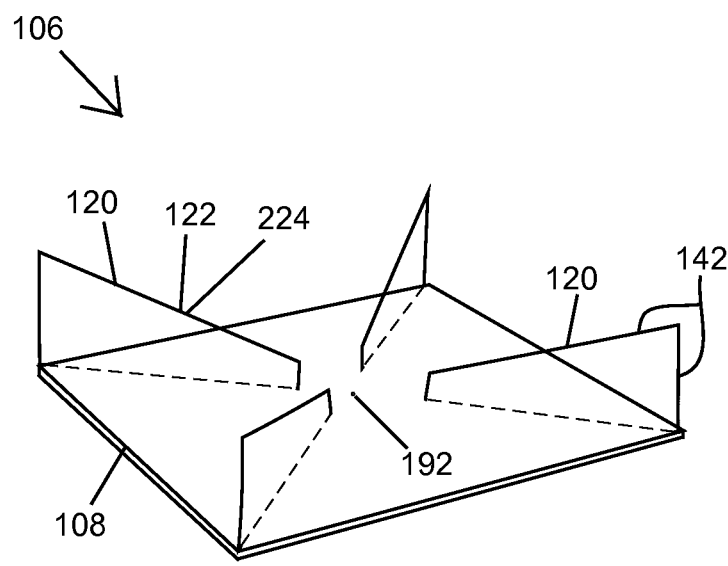
FIG. 23 is a perspective view of the input-key of FIG. 22.

In the embodiment of FIGS. 22 and 23 the touch locations 122 are symmetrical and have a slope that descents toward the central location 192. Such an actuator 120 would provide significantly better targets for a glancing touch at the perimeter than at the center. While touches closer to the center require a shorter range of the motion, which may be preferred by some operators, they pose a possibility that the glancing touch may unintentionally actuate the adjacent touch location. Reducing the elevation of the touch locations 122 toward the center, minimizes the chance of engaging the wrong actuator 120. Applying different height and form to the actuators may improve efficiency of operation. The embodiment of FIGS. 22 and 23 additionally demonstrates another way of constructing the actuator 120, where the actuator 120 is a frame formed with a highly flexible wire 142. Such an actuator functions in the same way as blade actuator 120 in FIG. 10, with added benefits of downward as well as lateral flexibility of the ridge 224 formed by the wire.

Figure 24:
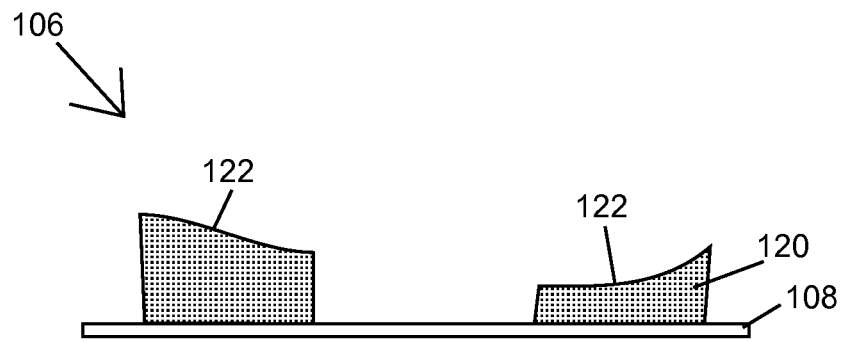
FIG. 24 is a side view of an input-key having irregular-shaped actuators.
Figure 25:
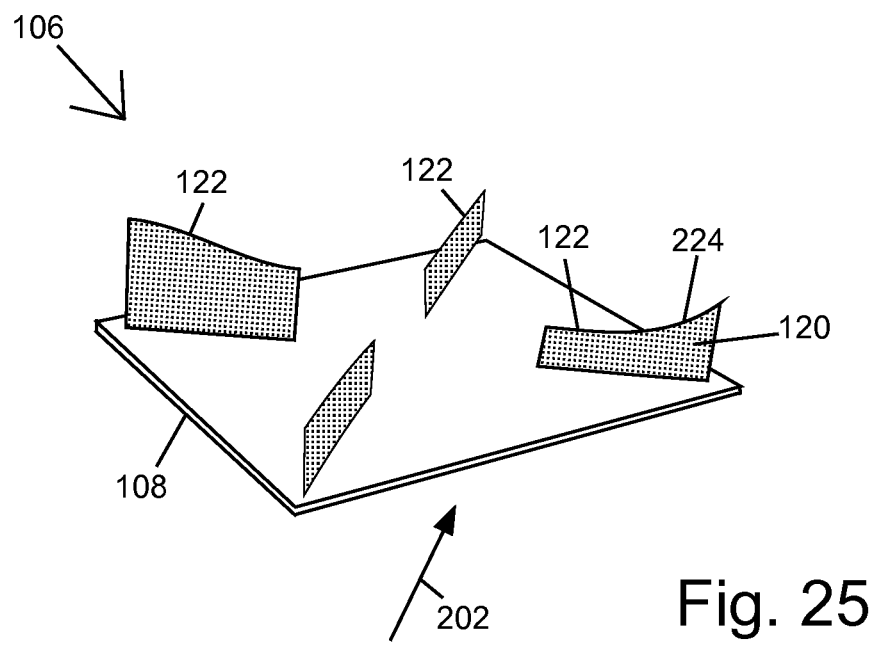
FIG. 25 is a perspective view of the input-key of FIG. 24.

Applying different profiles can make the touch locations 122 not only 'tactilely distinct' so that the touch locations can be distinguished one from another by a user by touch, but different profiles may improve targeting the actuators 120 by the fingertips. For example, when a user's fingers lack desired flexibility resulting in erroneous motions, it may help if the actuator 120 is made taller (or shorter), or actuator has a shape that compensates for the deficiency. As shown by FIGS. 24 and 25, the touch locations 122 are not necessarily of the same shape and are not necessarily symmetrical. Any shape for a touch location 122 that aids the operator in targeting the glancing touch may be used.

FIGS. 26 through 31 are end views of different configurations of the actuator 120 to provide tactile feedback to the user and to assist the user in distinguishing among the actuators. The actuators 120 of FIGS. 26 through 31 are elongated in the direction extending into the page, as illustrated by FIG. 10. Although the sensor (transducer) is generally a part of the actuator, as in FIG. 26, sensors are not illustrated on the actuator 120 depictions in FIGS. 27 through 31. FIG. 26 discloses a displacement-detection actuator 120 that in addition to a flexible joint 138 keeping the contacts in neutral position, has a flexible touch location 122, as shown by the broken lines, allowing for extensive bending, so that the touch location 122 may continue to move in the first 180 or second direction 182 after the actuator 120 detects the touch and enters the first or the second active state. The touch location 122 of the actuator of FIG. 26 is broad, and defines two edges 222.

FIG. 27 provides an actuator 120 in the shape of a thin, flexible blade, with the edge 222 of the blade defining the touch location 122. The thin blade defines a flat spring, providing resilience to the actuator 120. The touch location 122 of this embodiment combines edge 222 and ridge 224 into one tactilely prominent feature 220, providing prominent target for the fingertip glancing touch. A glancing touch by a fingertip to the thin touch location 122 is easily discernible by the user. Such actuator 120 may be used with displacement detectors 128 as well as with distortion detectors 130.

The flexible actuator 120 of FIGS. 26 and 27 as well as the wire actuator 142 shown by FIGS. 22 and 23 may allow for a wide range of first or second force and may provide that the glancing touch provides only a very small impediment to the glancing motion by the user's finger because the actuator may bend out of the way as the user completes the glancing motion. The flexibility of the actuator may also provide an improved perception of the touch, especially for distortion detectors 130 or surface-touch detectors 132. Nevertheless, the flexibility and compliance of skin at the fingertip allows to comfortably use the actuators with rigid touch locations and the choice between flexible and rigid touch location may reflect user's preference.

FIGS. 28 and 29 provide relatively wide actuators 120 having tactilely prominent features 220 to aid the user in feeling the glancing touch to the actuator 120. In FIG. 28, the tactilely prominent feature 220 is a ridge 224 or point in the center of the actuator. In FIG. 29, the actuator 120 has a triangular profile with tactilely prominent top ridge 224. Such profile may suggest an elongated triangular prism form or a pyramidal form with a pointed top.

FIGS. 30 and 31 provide tactilely prominent features 220 by defining the touch location 122 as a form with multiple edges 222. For FIG. 30, broad touch location features multiple edges 222 along with the ridge 224. For FIG. 31, the touch location 122 is defined by multiple upstanding spikes or bristles 283 to engage and stimulate the finger of the user. As illustrated by FIGS. 26-31, any configuration of the touch locations 122 that allows the user to tactilely perceive the touch location during the glancing touch is contemplated by the invention.

Figure 32:
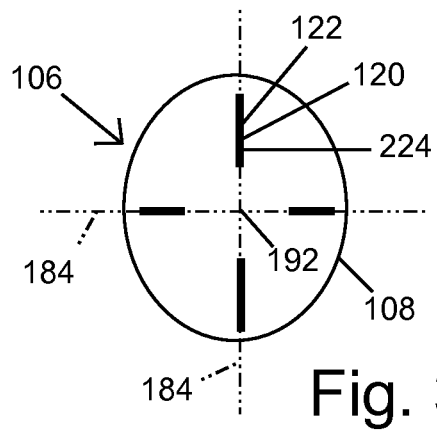
FIG. 32 is a plan view of an input-key having an oval base.

FIGS. 32 through 41 illustrate alternative shapes and orientations of the actuators 120 on the input-keys 106. FIGS. 32 through 41 each discloses an input-key 106 in a plan view. The indicated finger extension direction 202 defines the orientation of the input-key 106 with the user's hand when the input-key is in use, with the direction of finger extension 202 being the direction that the user's finger will move when the user extends the user's finger. FIG. 32 indicates the input-key 106 actuators 120 similar to the blade-shaped actuator 120 shown in FIG. 27. Input-key 106 in FIG. 32 is configured with the four narrow actuators 120 where the touch locations 122 take the form of ridges 224. The four touch locations 122 of the four actuators 120 are radially oriented about a central location 192 and located in the 12:00 o'clock, 3:00 o'clock, 6:00 o'clock and 9:00 o'clock positions respectively. The base 108 of the input-key of FIG. 32 is indicated as elliptical in shape, and two actuators 120 along the pivot line 184 in the direction of finger extension are longer than the other pair.

Figure 33:
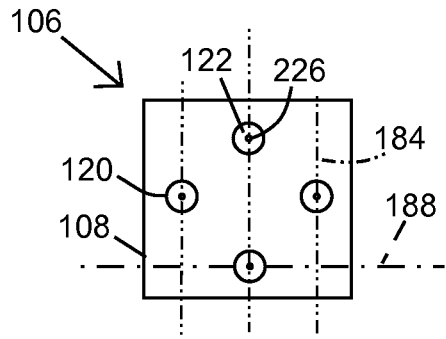
FIG. 33 is a plan view of an input-key having pointed-top touch locations.
Figure 34:
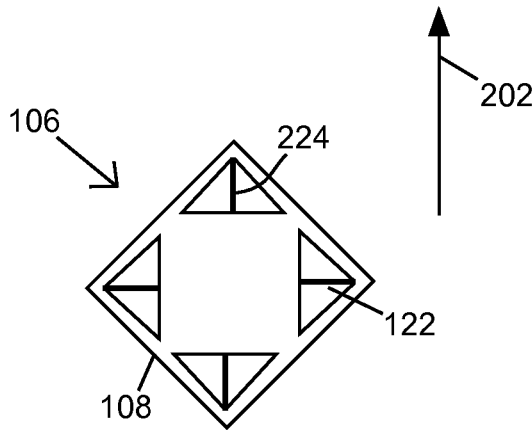
FIG. 34 is a plan view of an input-key having a diamond-shaped base and triangular actuators.
Figure 35:
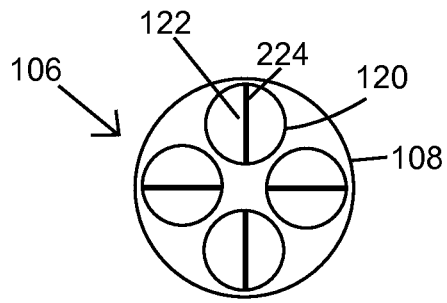
FIG. 35 is a plan view of an input-key having a circular base and circular actuators.

For FIG. 33, the touch locations 122 do not define ridges 224 and instead define tactilely prominent pointed tops 226. The pivot lines 184 of the actuators 120 are oriented in the direction of finger extension 202, and so the lines of actuation 188 are oriented transverse to the direction of finger extension 202. The lines of actuation 188 do not define a polygon. The input-key of FIG. 33 requires transverse motions of the fingertip to activate the actuators 120, and corresponds to the input-key 106 of FIG. 13, except that the input-key 106 of FIG. 13 uses finger extension and contraction motions to activate the actuators 120.

In contrast to FIG. 32 the input-keys 106 depicted on FIGS. 34 through 41 have broad actuators 120 defining broad touch locations 122. For FIG. 34 the actuators are triangular in shape and the base is rhombus, or diamond, shaped. The ridges 224 are radially disposed about a central location 192, as in FIG. 32. For FIG. 35, the tactilely prominent ridges 224 of the touch locations 122 are again radially oriented as indicated for FIG. 32; however, the actuators 120 have a circular outline in plan view, and are mounted on a circular base 108.

Figure 36:
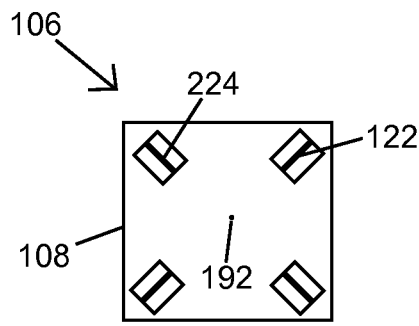
FIG. 36 is a plan view of an input-key having small rectangular actuators with an alternative orientation.
Figure 37:
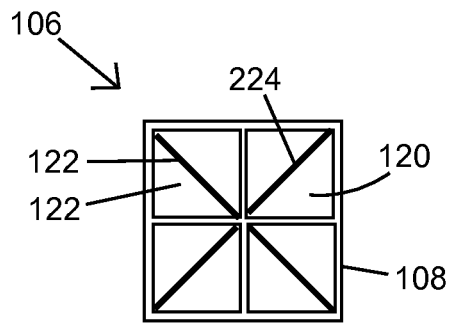
FIG. 37 is a plan view of an input-key having actuators with an alternative orientation.

FIGS. 36 and 37 disclose input-keys 106 in which the tactilely prominent ridges 224 of the touch locations 122 are radially disposed about a central location 192, but at 1:30 o'clock, 4:30 o'clock, 7:30 o'clock and 10:30 o'clock with respect to the finger extension direction 202. FIGS. 36 and 37 also illustrate that touch locations 122 of the actuators 120 may be small (FIG. 36) or large (FIG. 37).

Figure 38:
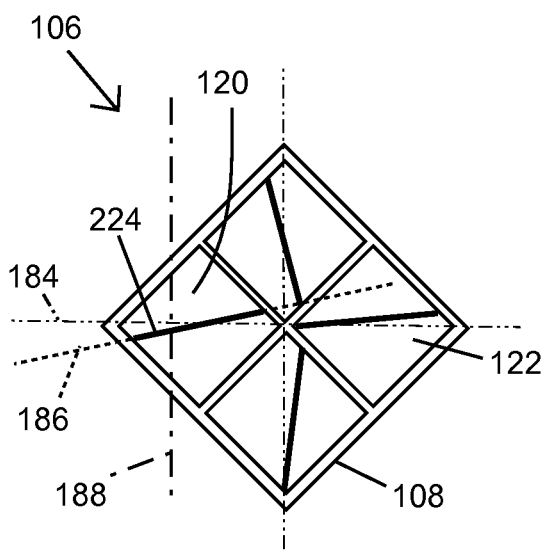
FIG. 38 is a plan view of an input-key having actuators with skewed touch locations.

FIG. 38 is the input-key of FIG. 37, except that it is in a diamond orientation. In this input-key 106 example, the tactilely prominent ridges 224 of the touch locations 122 are skewed in relation to the pivot line 184 of the actuator 120 and hence are not normal to the line of actuation 188 of the actuator 120. Although the ridge line 186 is typically parallel to the pivot line 184, it may be skewed from the pivot line 184. From FIG. 38, the tactilely prominent features of the touch location 122 may have any orientation with respect to the line of actuation 188.

Figure 39:
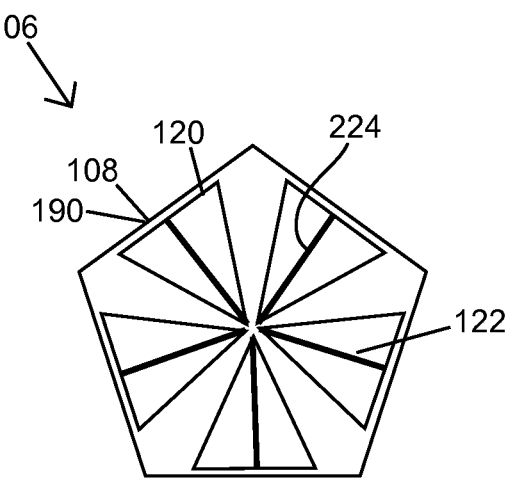
FIG. 39 is a plan view of an input-key having five actuators.

FIG. 39 illustrates that an input-key 106 may have a different number of actuators 120 than four. In the case of FIG. 39, five actuators 120 are included in the input-key 106 and are radially arrayed about the center. The touch locations 122 are broad and triangular in shape. The touch location 122 features tactilely prominent ridge 224. The base 108 is the same size as the perimeter 190 and defines a pentagon.

Figure 40:
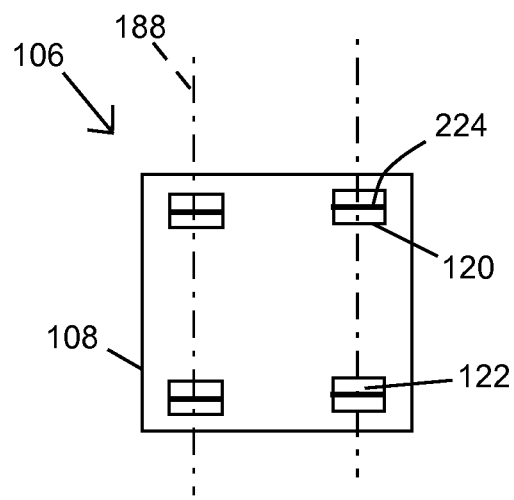
FIG. 40 is a plan view of an input-key having actuators with parallel lines of actuation.
Figure 41:
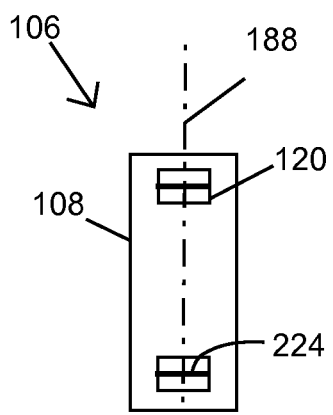
FIG. 41 is a plan view of an input-key having two actuators.

FIGS. 40 and 41 illustrate the input-key 106 having actuators 120 operated by the extension and flexion movements of the user's finger, and not the lateral movements. The input-keys 106 of FIGS. 40 and 41 have lines of actuation 188 that are coextensive. FIG. 41 also illustrates that an input-key 106 may have any number of actuators 120, in this case two actuators.

From FIGS. 32 through 41, any possible shape of the base 108 and any arrangement of actuators 120 on the base 108 to define an input-key 106 is contemplated by the invention. Any possible configuration of the tactilely prominent feature 220, such as a ridge 224, on the actuator 120 also is contemplated by the invention.

FIGS. 42 through 45 illustrate that combinations of input-keys 106 are used together to define a glance keypad 102 and that any of the combinations of first direction 180 and second direction 182 may be used. As shown, a combination of four input-keys 106, on a body 104 defines a glance keypad 102. Each of the input-keys 106 is assigned to a finger of the user's hand. The arrow indicating direction of finger extension 202 applies to all of FIGS. 42 through 45. For each of the glance keypads of FIGS. 42-45, four actuators 120 are provided for each input-key 106 as shown in FIG. 4 and FIG. 12, and the four actuators 120 are distributed about a central location 192 for each input-key 106. In FIG. 42 through 45 a depiction of an actuator 120, as it appeared in previous figures, is substituted by a set of two arrows indicating the first direction 180, and second direction 182 so that each such set of two arrows is regarded and labeled as an actuator 120. Each of the lines of actuation 188 for each input-key 106 is oriented as indicated by the arrows indicating first 180 and second directions 182 for each actuator 120. Although having four input-keys 106 per glance keypad 102 appears adequate for typical use, the glance keypad may have less than four keys, and more than four keys. To use keys in excess of four may require that fingers, wrist or arm are repositioned to access the keys.

Figure 42:
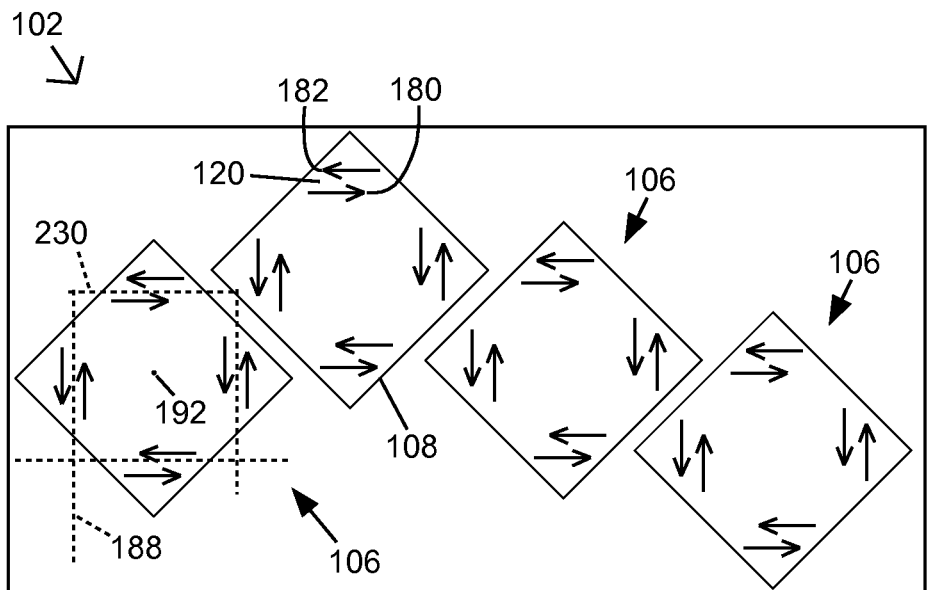
FIG. 42 is a glance keypad having four actuators and lines of actuation defining polygons.

FIG. 42 illustrates four input-keys 106 combined to form a glance keypad 102. The actuators 120 and touch locations 122 (not indicated) for each input-key 106 are arranged radially about a central location 192 of each input-key 106. For each input-key 106, the lines of actuation 188 together define a polygon 230, in this case a square, in the same manner as illustrated by FIG. 4 and FIG. 12. The glance keypad 102 and actuator 120 orientation of FIG. 42 has proven suitable in practice. The glancing motions of the glance keypad 102 of FIG. 42 are generally clockwise and counter-clockwise.

Figure 43:
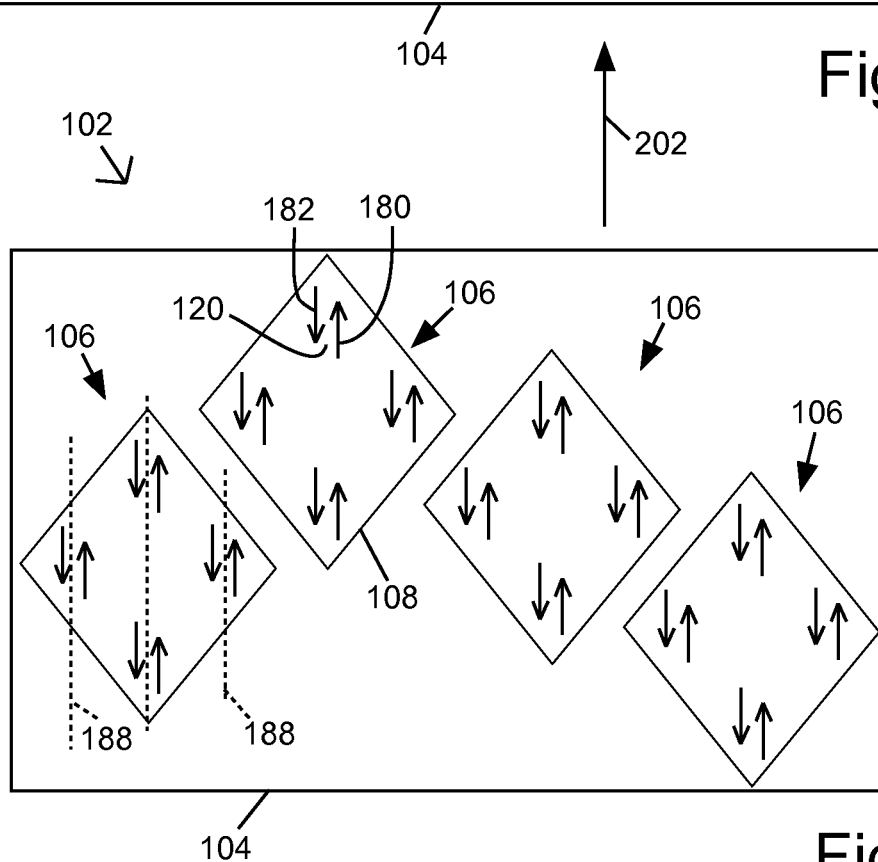
FIG. 43 is a glance keypad having four actuators and lines of actuation that are parallel.
Figure 44:
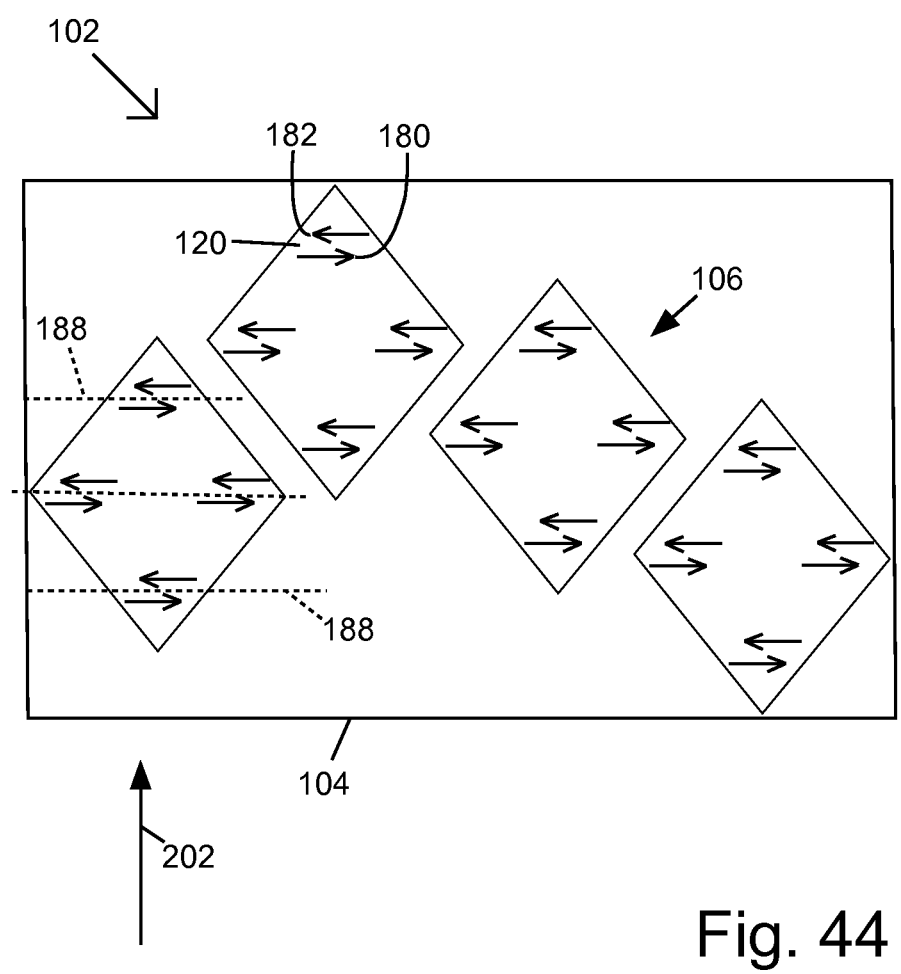
FIG. 44 is a second glance keypad having four actuators and lines of actuation that are parallel.

FIGS. 43 and 44 illustrate alternative embodiments of the glance keypad 102. The embodiment of FIG. 43 includes four input-keys 106, each of which has four actuators 120 in which the lines of actuation 188 are oriented in the general direction of finger extension 202 and flexion. In FIG. 43 the lines of actuation 188 of the input-keys 106 of the glance keypad 102 are parallel and do not define polygons. As illustrated by FIG. 13, the term 'parallel' is defined as 'extending generally in the same direction'. FIG. 44 is a second alternative embodiment of the glance keypad 102, in which the input-key 106 include actuators 120 having lines of actuation 188 that are transverse to the direction of finger extension 202, as illustrated by FIG. 33. The lines of actuation 188 for the input-keys 106 of FIG. 44 also are parallel and do not define polygons. Any possible direction of the lines of actuation 188 is contemplated by the invention.

Figure 45:
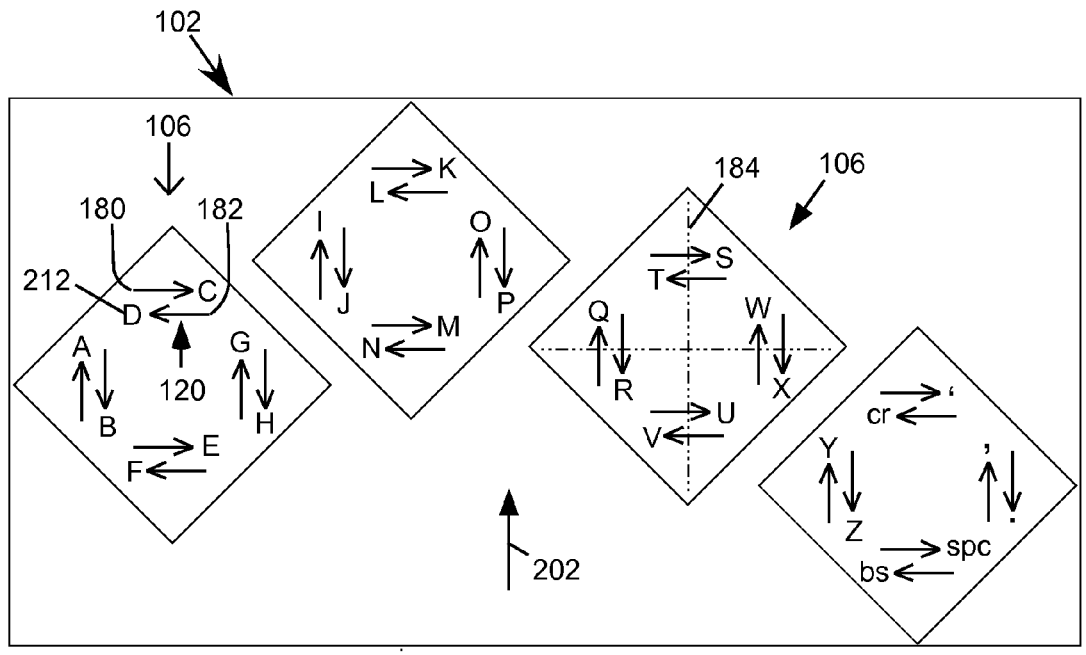
FIG. 45 is a glance keypad indicating a possible symbol assignment.
Figure 46:
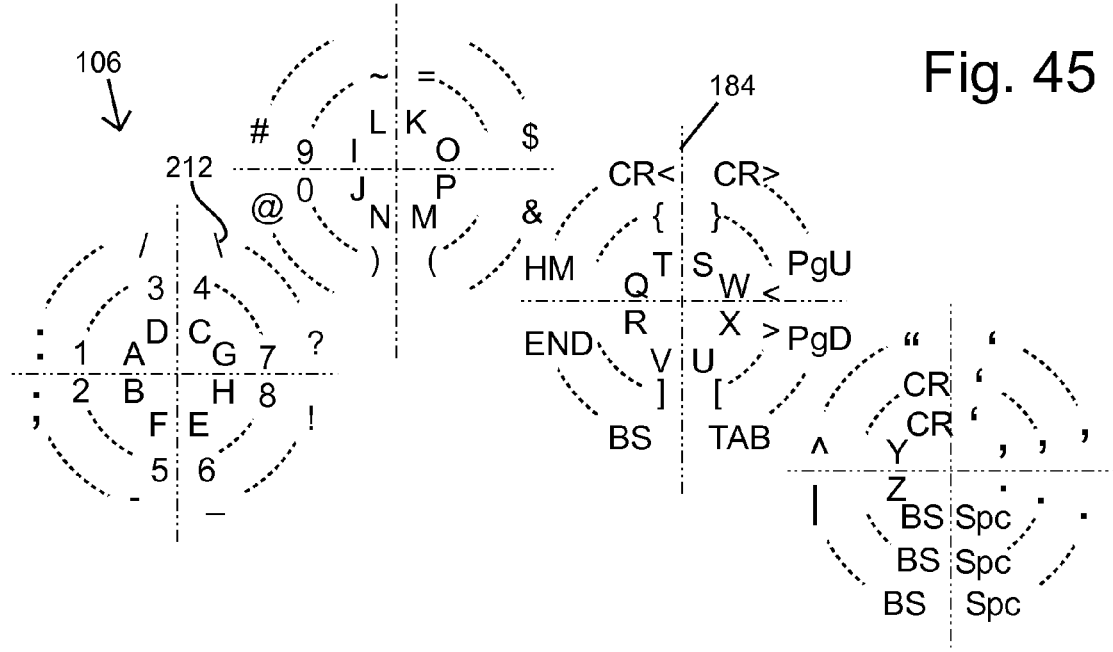
FIG. 46 is a diagram of example selectable symbol assignments to a glance keypad.

FIGS. 45 and 46 provide examples of symbol assignment to the first and second glancing touches of each of the actuators 120 of each input-key 106 of a glance keypad 102 having four input-keys 106 and four actuators 120 per input-key, where the actuators 120 are distributed as shown in FIG. 42. In the example of FIG. 45, a first glancing touch 181 in the first direction 180 to the uppermost actuator 120 of the leftmost input-key 106 will encode the letter 'C' to a computer to which the glance keypad 102 is operably attached. A corresponding second glancing touch in the second direction 182 to the same actuator 120 will encode a 'D.' FIG. 46 discloses one example of the different sets of symbols 212 that can be assigned to a glance keypad 102, as by manipulating the cluster of switching devices 126 by the user's thumb 270 as shown on FIGS. 58 and 59. In the example of FIG. 46, three sets of eight symbols 212 are assigned to the glance keypad 102; the three sets are distributed about three concentric rings, and each set of three concentric rings is representing symbols assigned to one input-key. The first set is disposed as the innermost ring, the second set—as the middle ring, and the third set—as the outer ring. Each arrangement of three concentric rings represents a set of symbols 212 assigned to one input-key 106. The innermost ring on the leftmost input-key 106 of FIG. 46 is assigned the same set of symbols as the leftmost input-key 106 in FIG. 45. Again using as an example the topmost actuator 120 of the leftmost input-key 106, a first glancing touch 181 to the actuator can encode a 'C,' a '4' or a '\', depending on which switch is selected from the cluster of switching devices 126. The different sets of symbols 212 correspond to the letters of the Roman alphabet, to numerals and to symbols and punctuation. Any other sets of symbols can be assigned.

Figure 58:
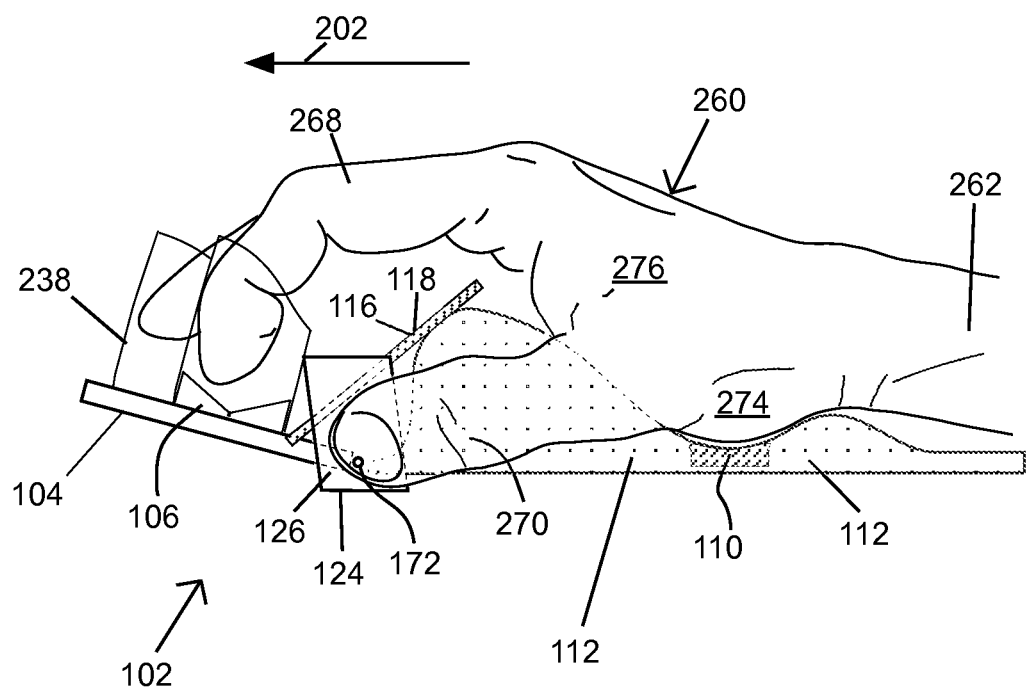
FIG. 58 is a side view of a glance keypad with a wrist support.
Figure 59:
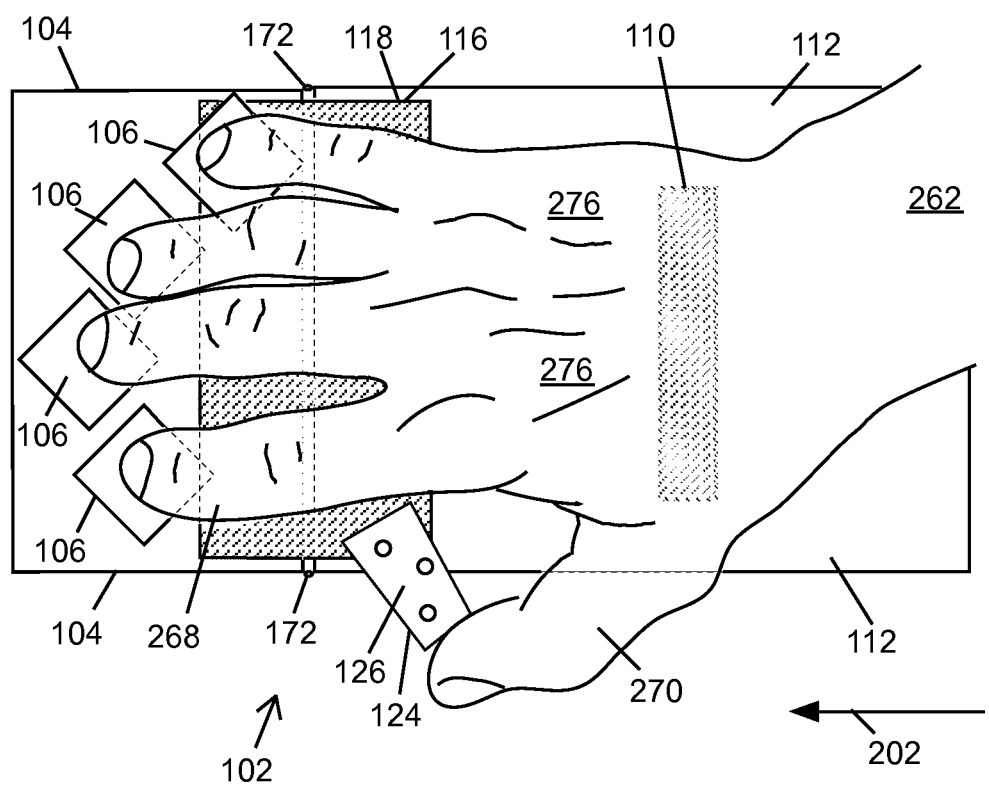
FIG. 59 is a top view of the glance keypad and wrist support.

Operating the glance keypad 102 requires that each of the user's fingers 268 be correctly positioned in relation to the input-key 106 assigned to that finger, as shown on FIGS. 1, 58 and 59. Even the best arrangement of input-keys 106 cannot assure flawless operation and fingers may slip out of position, causing unintended encoding of incorrect symbols. To allow the user to hold his or her fingers 268 in a consistent position and to reduce unintended encoding of symbols, a frequently-updated sensory input informing the user of the position of his or her fingers is needed. The fence 238 around each input-key 106 is helping to solve this problem. FIGS. 47 through 53 illustrate configurations of a fence 238 that may be disposed about the perimeter 190 of each input-key 106. The fence is composed of a resilient material 254, such as fabric 280, rubber 281, polymer 282, metal 284, bristles 283, or any other suitable material. The use of a fence provides the needed feedback to the user without interfering with the glancing motion of the fingers.

When encoding symbols using an input-key 106, the finger assigned to that input-key will frequently make contact with the fence 238. These random touches to the fence 238 may involve extensive portions about the circumference of the finger, involving, for example, two distal phalanges (segments) of the finger, though the actual touch area at any particular instance may be small. For a well-trained operator this feedback is responsible for subconscious "muscular awareness" of each finger position and helps maintain high efficacy of operation.

The fence 238 is a curtain-like structure surrounding each input-key and extending vertically above the touch locations 122 of the input-key 106 by, for example, 15 mm. The height of the fence 238 may vary, and can be made user-adjustable. The fence 238 is shaped to engage the distal and the intermediate phalanx of each of the user's fingers 268, as shown in FIG. 1 and FIG. 58. There is no requirement for the fence 238 to snugly fit around the user's finger 268. The snugness of fit and the height of the fence should be selected to accommodate the preferences of the user.

The fence 238 is configured so that the resistance of the fence to deformation in compression, i.e. by forces toward the base 108, is greater than the resistance to deformation in flexion, i.e. by forces parallel to the base 108, which allows the fence 238 to maintain its vertical orientation while still deforming readily in response to a glancing motion. The term 'resistance to deformation' is also referred to herein as 'stiffness'. The greater vertical stiffness also allows the finger to lean on the top of the fence 238 and to perceive the top edge 239 of the fence 238, all for the purpose of providing enhanced feedback to the user.

Figure 50:
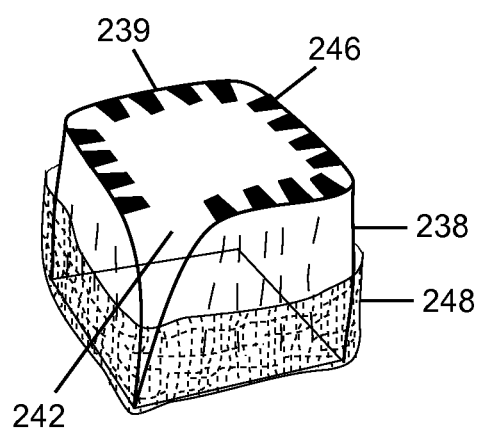
FIG. 50 is a perspective schematic diagram of a fence with inward-facing projections.

To helps in directing the fingertip 272 to the touch location 122 the fence 238 may be made to pose greater resistance to motion of the fingertip when the fingertip 272 is proximal to the touch location 122. As is illustrated by FIG. 50, the fence's 238 has a second layer of fabric 248 laid outside close to base 108. This band of fabric 248 is extending upward by a fraction of fence 238 height, which presses against the bottom wall of fence 238 making the bottom more resistant to deformation when pushed from the inside of the fence by finger 268. Another way of making fence 238 with varied stiffness would be to form fence 238 as thinner and more pliant in areas away from base 108 while thicker and more rigid in areas close to base 108.

Figure 55:
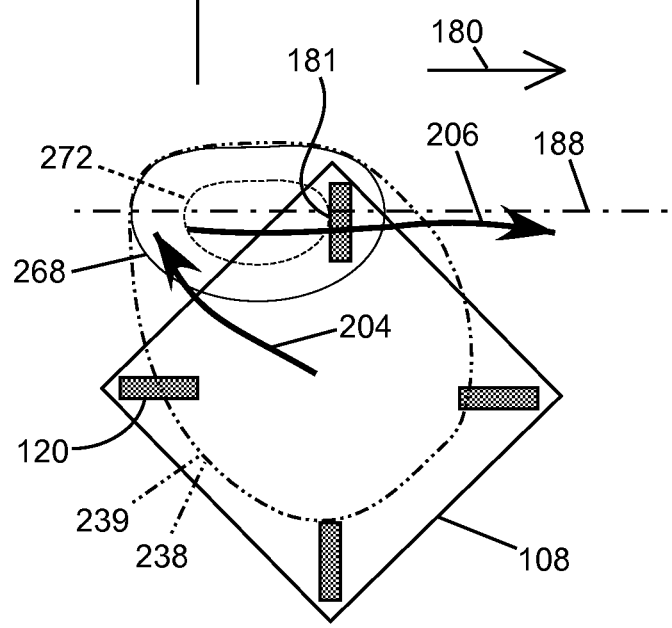
FIG. 55 is a plan view of an input-key showing finger movement outside of the perimeter.

The fence 238 may be rigid. To use a rigid fence would make the finger of the user frequently 'bump' against a rigid wall. A rigid fence 238 impedes the finger motion and reduces comfort of operating the device. In addition, the rigid fence 238 induces a strong sensation of touch to the rigid wall, which may compete and interfere with the sensation of soft touch to the actuator 120. The use of a flexible fence 238 instead of the rigid 'wall' around the finger provides several advantages. One advantage is the improved comfort of operation. Instead of being restrained, fingers may easily push against the fence, to allow for a fast glancing motion. Another advantage is improved tactile feedback to the user. The fingers of the user may touch and feel the inner sides and the top 239 of the fence 238 in order to judge the distance to the actuators 120. This allows the user to maintain his or her hand in a neutral position and to make precise, relaxed glancing motions. Another advantage of a pliable fence 238 is that it can offer generally constant resistance to stretching lateral motions, assuring gentle and uniform touch experience in directions parallel to the base. Instead of 'bumping' the finger against the rigid wall, when pushing the finger against the flexible fence 238 wall in the outward direction, the flexible fence 238 offers limited resistance allowing the finger to stretch, deform and even bend the whole fence structure, as illustrated by FIG. 55.

The resistance of the fence 238 to flexion is such as to assure that the touch-to-the-fence sensation is not competing with the fingertip touch-to-the-actuator sensation. The stiffness of the fence 238 in flexion should be the least that will provide adequate feedback to the user. An overly stiff fence 238 can cause user fatigue and pain and can reduce the user's ability to perceive a glancing touch. These issues can be overcome by a fence 238 that is adequately stiff to provide feedback to the user but adequately pliable to avoid fatigue, discomfort and interference with the user's ability to perceive the glancing touch.

Figure 47:
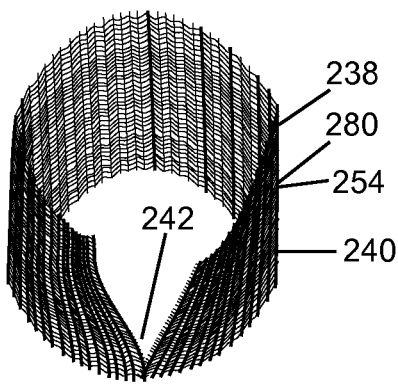
FIG. 47 is a perspective schematic diagram of a woven fence.

As shown by FIG. 47 the fence 238 may be composed of a fabric, such as woven fabric 280 composed of a natural or synthetic fiber. Alternatively, the fence 238 may be composed of a rubber 281, polymer 282, bristles 283, metal 284, or any other suitably flexible material that is capable of maintaining a pre-set shape even after extensive and repeated deformation.

The fence 238 may define a slit 242 to allow the user's fingers to be readily inserted and removed from the input-key 106, as to operate a touch-pad 116. For a particular embodiment, a fence 238 may include more than one slit 242, or none at all.

Figure 48:
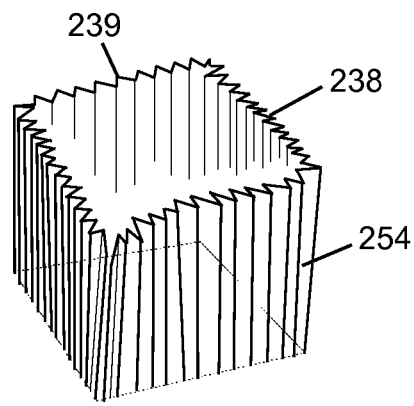
FIG. 48 is a perspective schematic diagram of a pleated fence.

From FIG. 48, the fence 238 may be pleated, crimped or crenellated, or of any other suitable form that allows the fence to remain upright but also to be readily deformed in flexion by the movements of the operator's finger.

Figure 49:
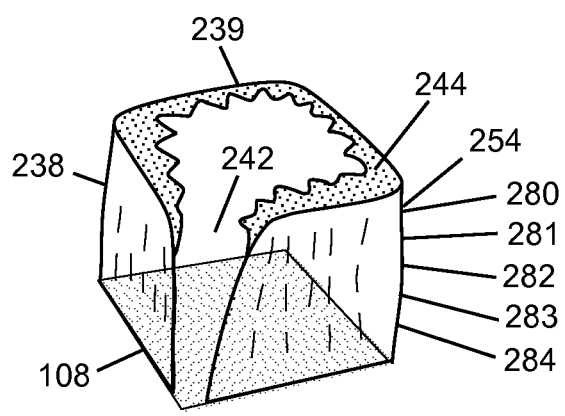
FIG. 49 is a perspective schematic diagram of a fence with a skirt.
Figure 51:
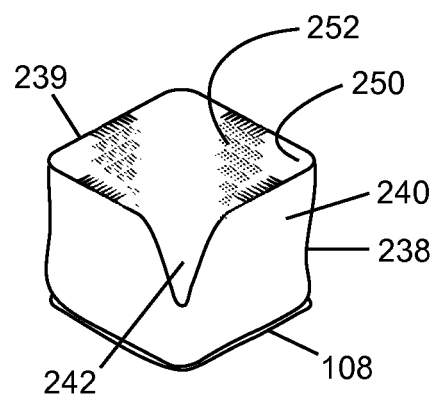
FIG. 51 is a perspective schematic diagram of a fence having multiple inward facing projections.
Figure 52:
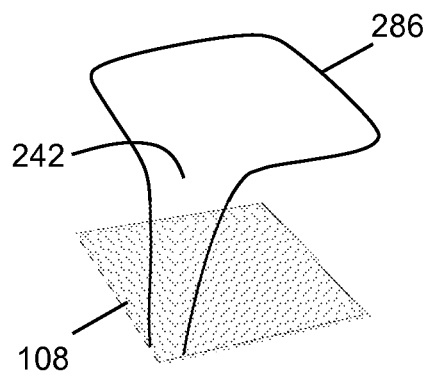
FIG. 52 is a perspective schematic diagram of a fence composed of a wire or plastic.
Figure 53:
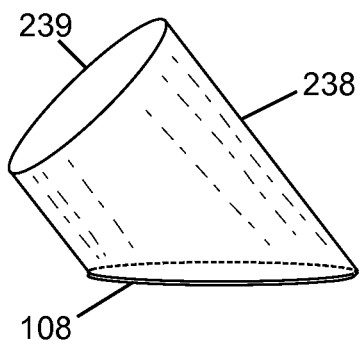
FIG. 53 is a perspective schematic diagram of a fence angled to accept a finger.

As indicated by FIGS. 49 through 51, the fence 238 may include projections to touch the user's finger and provide feedback as to the location of the user's finger. The projections may define an inward projecting skirt 244 about the inside of the fence 238, as in FIG. 49. Alternatively the fence's top edge 239, or its top portion, may bend toward the center to partially restrict the top opening. Any variation in shape is contemplated by the invention. The projections may be discrete, such as edge projections 246 shown by FIG. 50. The projections may be configured to be more flexible than the fence side wall 240 so that the edge projections 246 or skirt 244 deforms in response to touch more easily than the fence wall 240. Alternatively, the edge 239 and any structures installed on it, or the projections installed on the inner wall may be harder than the fence wall 240 to enhance the touch sensation. From FIG. 51, the fence 238 may display multiple inward facing projections 252 distributed along the inner surface 250 to engage the finger of the user. From FIG. 52, the fence 238 may be defined by a resilient wire 286. From FIG. 53, the fence 238 may be inclined in relation to base 108, to receive the user's finger.

The fence 238 may be configured to be hidden when not in use, as by folding or receding into the body of the glance keypad. The fence may be removable and may be un-installed as desired by the user. The height of the fence 238 may be user adjustable. The fence may be also installed around the thumb pad 124 (not illustrated).

Figure 54:
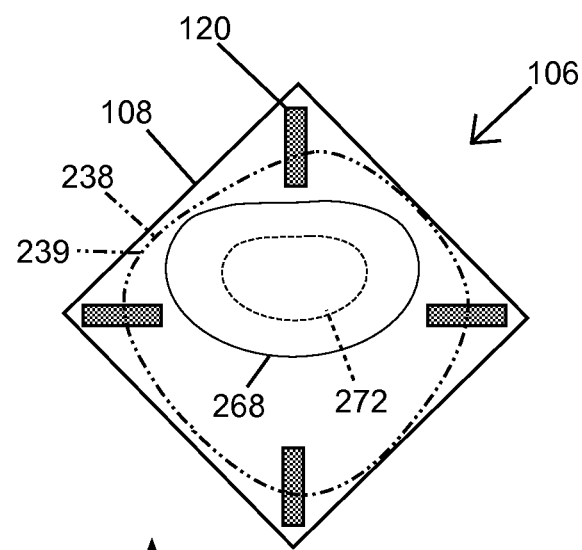
FIG. 54 is a plan view of an input-key.

A fence 238 is more effective when the fence 238 is mounted to a diamond-shaped input-key 106, as shown by FIGS. 54 and 55. For such a configuration, the user cannot avoid touching the slanted wall of the fence 238. FIG. 54 illustrates the finger 268 in neutral position, such that the fingertip 272 shown as a smaller oval, stays safely above the level of touch locations of the actuators 120. The phantom line shows the top edge 239 of the fence 238 loosely wrapped around the finger 268. FIG. 55 shows that, in order to push the actuator 120 to the right, the fingertip 272 moves to the left of the actuator 120, as shown by the arrow 204 indicating the positioning motion. The finger 268 presses against the left side of fence 238, displacing the fence beyond input-key 106 border, such as base 108, to the left and slightly to the top. Due to elasticity of the fence 238, the fence wall deforms and shifts, and the finger 268, and the fingertip 272, can be moved beyond the input-key 106 footprint and even may encroach upon the footprint of the adjacent input-key, FIG. 55. The actuator 120 feels to the user longer than its physical length would indicate, expanding the perceived footprint of the input-key 106. The user feels the touch to the fence, and the sensation is used to guide the finger motions. After making the glancing motion shown by the arrow 206, the user's finger 268 resumes its resting position as shown by FIG. 54, the fence 238 regains its original shape.

Figure 56:
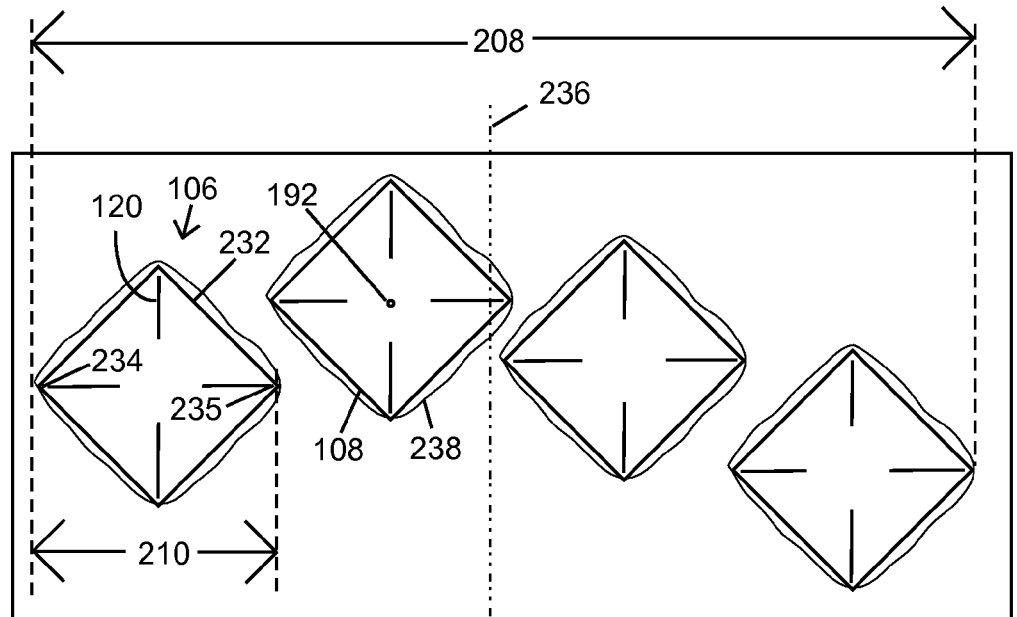
FIG. 56 is a plan view of a glance keypad.
Figure 57:
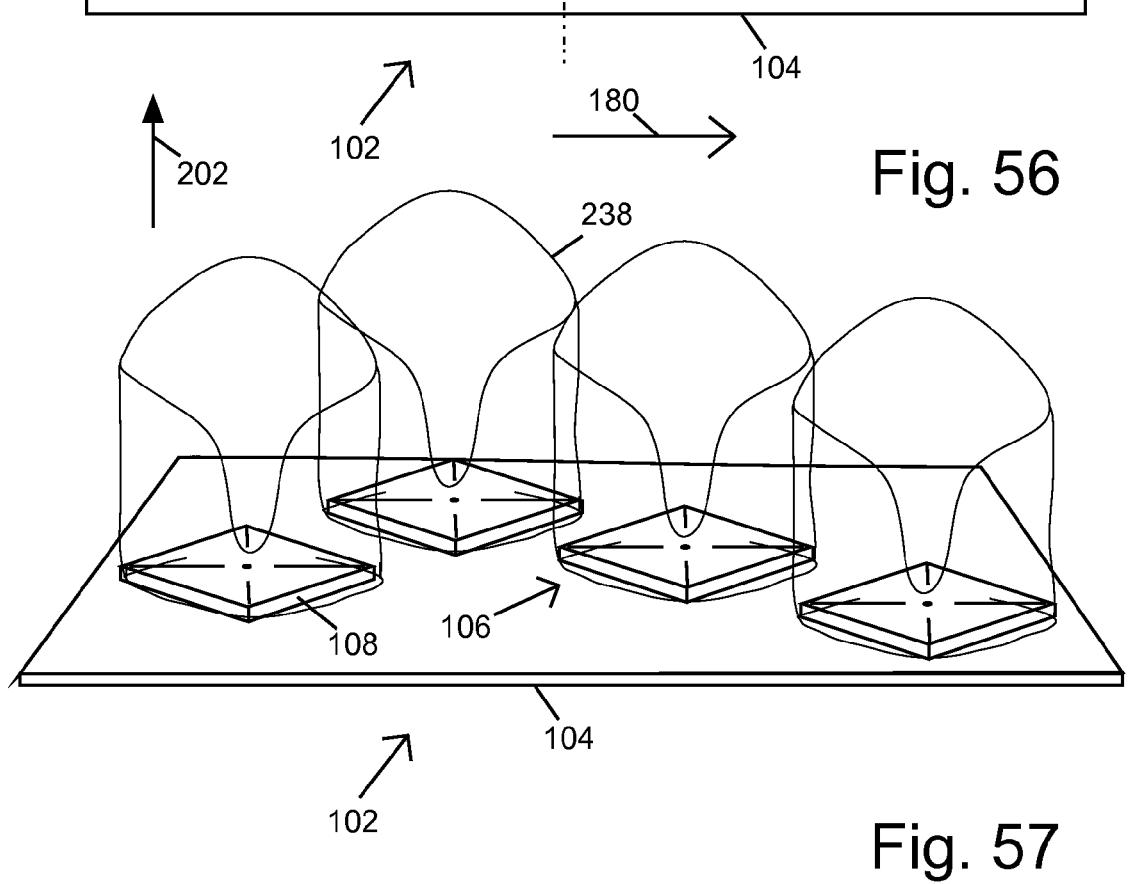
FIG. 57 is a perspective view of a glance keypad.

FIGS. 56 and 57 illustrate the disposition of the input-keys 106 and fences 238 on a glance keypad 102. Each actuator 120 of each input-key 106 is configured to be within the simultaneous operative reach of the fingers of the user; namely, the user can make a first and a second glancing touch to each of the actuators 120 in the first 180 and second directions 182 without moving the forearm of the user, as illustrated also on FIG. 59. This arrangement requires the input-keys 106 to be relatively small and relatively close together. Input-keys 106 having a perimeter 190 of a rhombus (diamond) shape 232, allow for overlapping compact disposition of input-keys. FIG. 56 indicates the individual width 210 dimension of the input-key 106, which is defined as the input key 106 width from a corner 234 to the opposing corner 235 when measured in transverse orientation to the longitudinal axis 236 of the glance keypad 102. FIG. 56 also indicates the combined width 208 of a set of four input-keys 106 measured in transverse orientation to the longitudinal axis 236 of glance keypad 102. On the glance keypad 102 of FIG. 56 the combined width 208 is less than the sum of individual widths 210.

FIG. 58 shows a user's hand 260 operating the glance keypad 102, in a lateral view, and FIG. 59 shows user's hand 260 operating the glance keypad 102, in a top view. Both figures introduce additional apparatus that may stabilize the user's hand 260 for accurate use of the glance keypad 102. While the glancing motion does not require extreme accuracy, such a motion demands a generally stable trajectory by the user's finger 268. Any change in the hand 260 position with respect to the glance keypad 102 can result in an altered trajectory of the finger 268, which may lead to a glancing touch that misses its target. Unless the user watches the screen or is experienced in discerning erroneous touches, the user may not detect the error. To help locate the user's hand 260 and avoid missed glancing motions, the glance keypad may include a wrist rest (wrist support) 112.

The glance keypad may include additional features to provide even more secure wrist positioning. FIG. 58 shows the wrist rest 112 shaped to partially envelop the heel 274 of the user's hand 260. As noted above, the fence 238 around each finger 268 also plays an important role in stabilizing the hand during operation. An experienced user may acquire skill to operate the glance keypad 102 using no wrist support and relying solely on the fences 238.

The glance keypad 102 may be continuous with the wrist rest 112 or two parts may be connected with a hinge 172, as in FIG. 58. The hinge 172 allows for the front part of the glance keypad 102 to be tilted against the wrist rest part 112, to give better access to the input-keys 106. The wrist rest 112 may be also equipped with a brace or strap utility, to firmly attach the glance keypad to the distal forearm 262. The wrist rest 112 may have a feedback-delivering vibrating pad 110 mounted in a position where the heel of the hand 274 contacts the wrist rest 112, as shown by FIGS. 58 and 59.

As shown by FIGS. 58 and 59, the glance keypad 102 may be combined with screen navigation devices 118 such as a touch pad 116 or track ball. The touch pad 116 or track ball may be used to navigate a cursor on a computer screen in a conventional manner FIG. 58 shows the touch pad 116 mounted onto the wrist support 112 in a space below the user's fingers 268 and in front of where the heel of the hand 274 touches the rest 112; that is, under the arch created by user's raised metacarpal area 276. In the illustrated location, the touch pad 116 can be accessed by flexing one of the fingers 268 and without changing the wrist position. To minimize the range of motions required to reach the touch pad 116, the pad 116 may be shaped to fill the entire area of the glance keypad 102 on the rear of input-keys 106 such as the oval touch pad 116 shown by FIG. 60, or may be any other suitable shape. To give fingers better access, the touch pad may be recessed below the glance keypad body 104 surface, may be level with the surface, or raised above the body 104. As shown on FIG. 58 the touch pad 116 may inclined in relation to the wrist rest 112 by a predetermined angle, for example 30 degree, which makes it also inclined in relation to the plurality of input-keys, or having the inclination angle user-adjustable, to allow better access to the touch area.

FIG. 60B illustrates a glance keypad 102 that can be configured for interchangeable use by either the left or right hand 260 of a user. By switching hands periodically the operator may reduce fatigue, exertion and muscle strain. Two tasks may be performed quasi-simultaneously, e.g. using one hand for typing, allows use other hand for flipping through the stack of documents.

A glance keypad 102 may be configured for use in conjunction with a second glance keypad 102 so that the user may alternate between the left and the right hand, or utilize both hands to encode symbols simultaneously.

Figure 60:
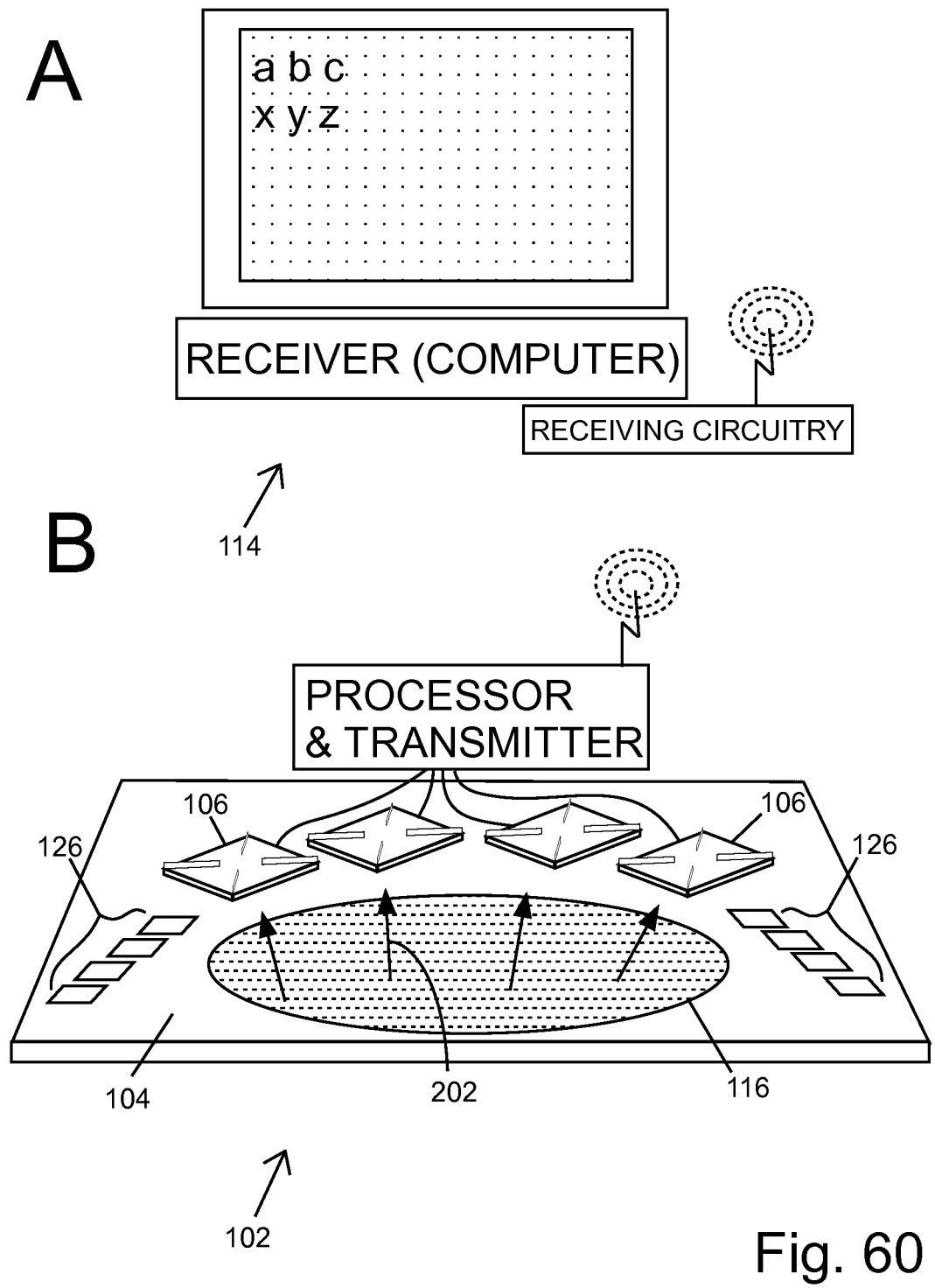
FIG. 60 is a schematic diagram showing the glance keypad in communication with a computer.

FIG. 60 illustrates that the glance keypad is configured to communicate with a computer 114 and to transmit symbols encoded by the glance keypad 102 to the computer. The interface with the computer may use a wired system using standard keyboard connection or any equivalent wired system. In another embodiment, the interface module may utilize a wireless system. Such a wireless system may include a transmitter built into the glance keypad and a receiver configured to communicate with the destination computer, as shown by FIG. 60. Due to miniaturization of electronic circuits such interface may be integrated with the glance keypad 102 without adding to its overall dimensions.

Two purposes of the glance keypad are to make computers easier to operate and more portable. The glance keypad of the symbol encoding apparatus may accomplish these goals in at least one embodiment, by lowering the force and the range of motion required to encode symbols and by promoting operation of the glance keypad by touch. The encoding of symbols using the glance keypad involves sequential activation of actuators rather than simultaneous activation of multiple pushbuttons, as on a conventional chording keyboard. The sequential operation of the glance keypad is easy to learn compared to the simultaneous button presses of a chording keyboard. Use of the glance keypad also avoids errors caused by premature, delayed or simultaneous actuation of keys on a chording keyboard.

The glance keypad utilizes readily available technologies and hence is relatively easy and inexpensive to manufacture. The glance keypad may be configured to be incorporated into existing computer systems that require a data input device and may be a built-in or a free-standing replacement for the conventional QWERTY keyboard. The glance keypad may be fitted with a mouse, track ball, or touch pad and may provide an integrated touch-guided apparatus for data entry and for operation of the computer.

The glance keypad may be configured as an autonomous device and equipped with an on-board microprocessor and computer memory accessible to the microprocessor. The input-keys of the glance keypad are configured to communicate with the on-board microprocessor and computer memory. A glance keypad configured as an autonomous device would be useful for note-taking and transcription. The small size, weight and touch operation of the autonomous device would support such use.

The input-keys and the glance keypad may be sized to fit hands and fingers of different sizes. For example, the width of the assembly of four input-keys, and the length of each actuator, may differ according to thickness of the user's finger and the size of the user's hand. In addition, input-keys for use by children may be made smaller and softer in touch than those intended for use by adults.

The glance keypad may be used generally to communicate with all devices that are equipped to receiving its signals. That comprises navigating the display, browsing the web, operating applications, inputting data, texting and word processing. Glance keypad may be also used as a universal communicator with, or a controller for, the whole range of electronic devices and processes. For example, present controllers for every consumer device on the market are configured differently and uniquely, are uncomfortable to operate, and as being one among many, often get displaced and hard to find. Having in disposition a glance keypad, may solve some of these problems. Glance keypad controller would operate using unambiguous easily remembered verbal commands, that can be easily converted into a variety of useful controlling signals to accommodate any device. The operator may utilize a set of easy to remember or familiar phrases, and being able to operate the device with automatic glancing motions, can generate fast and without effort a command of any complexity.

Sightless operation and efficiency of the glance keypad would also benefit people with sight or speech impairment.

The four-input-key glance keypad may be used by a completely untrained operator in a manner similar to the hunt-and-peck technique used by one-finger typists using a QWERTY input-keyboard. Glance keypad operation using one finger requires the user to visually observe the operation, by simultaneously monitoring the finger motion, the input-keys and indices of character assignments. The one-finger user (1) consults indices of characters, (2) locates the input-key to which the desired symbol is assigned, (3) locates the actuator of the input-key, (4) positions the user's finger in relation to the actuator, and (5) performs the glancing motion to actuate the switch, encoding the symbol.

The glance keypad may utilize less than four input-keys and may feature a single input-key. The user may also encode any of a large number of symbols using a single input-key by using switches to assign a one of a plurality of sets of symbols to the single input-key.

Use of a glance keypad having fewer than four input-keys would be particularly useful for a user who does not have use of all of his or her fingers or otherwise has limited motor function. Shift switches may be actuated by motion of any appropriate body part, such as the user's foot, tongue or any other part of the user's body. The actuators and shift switches may be sized to accommodate the body part actuating the actuator or switch.

The glance keypad can be supported by a surface for use, as by being attached to the user's garment. Alternatively, a strap or brace may be secured to the glance keypad and to the distal forearm of the user. The glance keypad may be equipped with a hand cover to envelop user's hand and protect the user's hand from cold and from the elements. Such a hand cover is a useful addition to the device since operation of the glance keypad does not require the user to observe the input-keys. The hand cover also may secure the glance keypad to the user's hand, allowing the user to encode symbols while the user is in motion.

As shown by FIGS. 58 and 59, the glance keypad may be configured to provide active feedback to the user upon the occurrence of an event, such as when a symbol is encoded. For example, tactile feedback may be generated by using the electrical signal of the contact closure to activate an electromechanical transducer, for example, a piezoelectric vibrator 110. Such feedback has no delay and uses no extra force from the user, as the 'clicking' actuator would. The glance keypad equipped with such a transducer may deliver a mechanical jerk, vibration or other sensory disturbance to indicate that an event has occurred. The sensory disturbance may be delivered to the touching finger. Alternatively the sensory disturbance might be delivered by transducer to the palm, heel of the hand 274 or to other locations on the body.

The same apparatus may be adapted to generate sounds and used as a musical instrument.

Although the description above contains many specificities, these should not be construed as limiting the scope of the embodiments but as merely providing illustrations of some of many possible variations. The scope of the embodiments should be determined by the appended claims and their legal equivalents, rather than by the examples given.

The following are the numbered elements from the specification, drawings and claims.

102 glance keypad
104 body
106 input-keys
108 base
110 vibrating pad
112 wrist rest, wrist support
114 computer
116 touch pad
118 screen navigation device
120 actuator
122 touch location
124 thumb pad
126 cluster of switching devices
128 displacement detector
130 distortion detector 132 surface-touch detector
134 strain gauge
138 flexible joint
140 fingertip deformation
142 flexible wire actuator
144 sensor with mechanical contacts
145 resistance sensor
146 capacitance sensor
147 acoustical sensor
148 piezoelectric sensor
149 inductance sensor
150 magnetic sensor
154 first stationary contact
156 second stationary contact
158 movable contacts
164 gap between contacts
170 pivot mount
172 hinge
174 spring
180 first direction
181 first glancing touch
182 second direction
184 pivot line
186 ridge line
188 line of actuation
190 perimeter
192 central location
194 force component along line of actuation
196 force component normal to the line of actuation
198 touch-force vector
200 angle of effective glancing touch
202 direction of finger extension
204 positioning motion
206 glancing motion
208 width of combination of input-keys
210 width of an input-key transverse to the longitudinal axis
212 symbol
220 tactilely prominent feature
222 edge (on the touch location)
224 tactilely prominent top ridge
226 tactilely prominent pointed top
230 polygon
232 diamond shape
234 corner
235 opposing corner
236 longitudinal axis
238 resilient fence
239 top edge (on the fence)
240 fence side wall
242 slit
244 inwardly-projecting skirt
246 edge projections
248 second layer of fabric
250 inner surface
252 inward facing projections
254 resilient material
260 hand
262 forearm
268 finger
270 thumb
272 fingertip
274 heel of hand
276 metacarpal area
280 fabric
281 rubber
282 plastic, polymer
283 bristles
284 metal
286 flexible wire fence

The invention claimed is:

1. An apparatus for encoding symbols into a computer, the apparatus comprising:
    a. a base
    b. a plurality of actuators
        i) each said actuator defining a touch location, each said touch location being located above said base in a spaced-apart relation to said base, each said touch location being tactilely distinct from each other said touch location and from said base;
        ii) said actuator defining only two active states, said actuator being configured to actuate a first active state by a first force exerted against said touch location in a first direction, said actuator being configured to actuate a second active state by a second force exerted against said touch location in a second direction, said second direction being substantially opposite to said first direction, said first and said second directions for each said actuator in combination defining a line of actuation of said actuator;
        iii) said base defining a plan view when viewed from above along a line generally orthogonal to said base, said lines of actuation of said plurality of actuators in combination defining a polygon in said plan view;
        iv) each said actuator being located so that a fingertip of a user can apply a first glancing touch in said first direction and a second glancing touch in said second direction to each said touch location when a forearm of said user supporting a hand to which said fingertip is attached is stationary with respect to said base, and wherein said first and said second glancing touches apply said first and said second force to said touch location;
        v) each said active state encoding a different symbol from a set of symbols when said apparatus is operably connected to a computer;
    c. a fence, said plurality of touch locations defining a perimeter, said fence being disposed about said perimeter, said fence rising above said base, said fence being configured to allow contact between said fence and said user's finger and to inform said user about where said user's finger is located with respect to each said touch location.

2. The apparatus of claim 1 wherein said fence is composed of flexible, resilient material, said first or second glancing touch being a part of a glancing motion by said finger of said user, said fence being adequately flexible and resilient to allow said finger of said user to deform said fence while making said glancing motion.

3. The apparatus of claim 2 wherein said fence is composed of a material selected from a group consisting of fabric, rubber, plastic, metal, bristles, and any combination thereof.

4. The apparatus of claim 2 wherein said fence having a resistance to deformation in compression generally normal to a base, said fence having a resistance to deformation in flexion generally parallel to said base, said resistance to deformation in compression being greater than said resistance to deformation in flexion.

5. The apparatus of claim 2 wherein said fence having one or more slits.

6. The apparatus of claim 2 wherein said fence having inward facing projections, said fence having an inner surface, said inward facing projections being located on said inner surface.

7. The apparatus of claim 2 wherein said fence defines a fence side wall, said fence side wall defining a fence top edge, said fence top edge defining inward facing projections.

8. The apparatus of claim 7 wherein said inward facing projections defining an inward-projecting skirt.

9. The apparatus of claim 7 wherein said inward facing projections are configured to touch a finger of which said fingertip is a part prior to said touch of said finger to said fence side wall when said finger approaches said fence from within said perimeter.

10. The apparatus of claim 2 wherein said fence defines a fence side wall, said fence side wall having a resistance to deformation in flexion proximal to said base, said fence side wall having a resistance to deformation in flexion distal to said base, said resistance to deformation in flexion proximal to said base being greater than said resistance to deformation in flexion distal to said base.

11. The apparatus of claim 1 wherein each said actuator has an actuation sensitivity threshold in said first and said second directions to actuate said first and said second states, said actuation sensitivity threshold being selected to be in the range of 0.0005 newtons to 5 newtons.

12. The apparatus of claim 1 wherein each said actuator has an actuation sensitivity threshold in said first and said second directions to actuate said first and said second states, said actuation sensitivity threshold being selectable by said user.

13. The apparatus of claim 1 wherein each said actuator has an actuation sensitivity threshold in said first and said second directions to actuate said first and said second states, said actuation sensitivity threshold being less than 0.3 newtons.

14. The apparatus of claim 1 wherein each said actuator has an actuation sensitivity threshold in said first and said second directions to actuate said first and said second states, said actuation sensitivity threshold being less than 0.03 newtons.

15. The apparatus of claim 1 wherein said actuator is one of a displacement detector, a distortion detector and a surface-touch detector.

16. The apparatus of claim 1 wherein said actuator being selected from a group consisting of: a sensor with mechanical contacts, a resistance sensor, a capacitance sensor, an acoustical sensor, a piezoelectric sensor, an inductance sensor, and sensors using signals involving any of electromagnetic spectrum, and using any combination of mechanical, resistance, capacitance, optical, acoustic, piezoelectric and electromagnetic radiation sensors.

17. The apparatus of claim 1 wherein said plurality of touch locations define a perimeter, said perimeter defines a central location, said plurality of touch locations being arrayed about said central location and proximal to said perimeter, said plurality of touch locations being in a spaced-apart relation.

18. The apparatus of claim 1 wherein each said touch location having a shape, said shape being selected to provide a prominent target for said fingertip of said user when said fingertip applies said first glancing touch or said second glancing touch to said touch location.

19. The apparatus of claim 1 wherein each said touch location defines a tactilely prominent ridge, each said ridge defining a ridge line, each said ridge line being substantially orthogonal to said line of actuation of said actuator.

20. The apparatus of claim 19 wherein said ridge lines do not intersect at a single point.

21. The apparatus of claim 1 wherein said each touch location being a tactilely prominent pointed top.

22. The apparatus of claim 1 wherein said plurality of actuators having a number, said number being four.

23. The apparatus of claim 22 wherein said plurality of touch locations define a perimeter, with said perimeter having substantially a rhombus shape.

24. The apparatus of claim 1 wherein said plurality of actuators and said base in combination define an input-key, said input-key being one of a plurality of input-keys, the apparatus further comprising: a body and said plurality of input-keys, said plurality of input-keys being disposed on said body to define a glance keypad.

25. The apparatus of claim 24 wherein said plurality of input-keys is within simultaneous operative reach of a plurality of fingers when said forearm is stationary with respect to said body.

26. The apparatus of claim 24 wherein said plurality of input-keys having a number, said number being four.

27. The apparatus of claim 24 wherein respective touch locations of each of said input-keys define a perimeter, said perimeter having a rhombus shape, each said rhombus having a width from a corner to an opposing corner, said glance keypad having a longitudinal axis, said input-keys being disposed on said body with said corner and said opposing corner being oriented transverse to said longitudinal axis, a width of said input-keys in combination transverse to said longitudinal axis being less than a sum of said widths of said input-keys.

28. The apparatus of claim 25 further comprising a cluster of switching devices positioned within reach of a thumb of a human hand when any of said plurality of input-keys is within said simultaneous operative reach by said plurality of fingers.

29. The apparatus of claim 25 further comprising a screen navigation device, said screen navigation device being disposed on said body within reach by at least one of said plurality of fingers when said plurality of input-keys are within said operative reach by said plurality of fingers.

30. The apparatus of claim 29 wherein said screen navigation device being a touchpad.

31. The apparatus of claim 30 wherein said touchpad is inclined in relation to said plurality of input-keys.

32. The apparatus of claim 1 wherein each said touch location of said plurality of actuators is at a different elevation above said base than other said touch locations.

33. The apparatus of claim 1 wherein each said touch location of said plurality of actuators is of different length than other said touch locations.

34. The apparatus of claim 1 wherein each said touch location has an irregular shape.

35. The apparatus of claim 1 wherein said touch locations having a slope.

36. The apparatus of claim 1 wherein said touch locations are flexible.

37. The apparatus of claim 1 wherein said actuators are in a form of a blade.

38. An apparatus for encoding symbols into a computer, the apparatus comprising:
  a. a base
  b. a plurality of actuators
    i) each said actuator defining a touch location, each said touch location being located above said base in a spaced-apart relation to said base, each said touch location being tactilely distinct from each other said touch location and from said base;
    ii) said actuator defining two active states, said actuator being configured to actuate a first active state by a first force exerted against said touch location in a first direction, said actuator being configured to actuate a second active state by a second force exerted against said touch location in a second direction, said second direction being substantially opposite to said first direction, said first and said second directions for each said actuator in combination defining a line of actuation of said actuator, said lines of actuation being substantially parallel;

iii) each said actuator being located so that a fingertip of a user can apply a first glancing touch in said first direction and a second glancing touch in said second direction to each said touch location when a forearm of said user supporting a hand to which said fingertip is attached is stationary with respect to said base, and wherein said first and said second glancing touches apply said first and said second force to each said touch location;

iv) said plurality of touch locations define a perimeter about said plurality of actuators, the apparatus further comprising a resilient fence, said fence being disposed about said perimeter, said fence rising above said base, said fence being configured to allow contact between the fence wall and the user's finger thereby informing the user about where the user's finger is located in respect to each touch location;

v) each said active state encoding a different symbol from a set of symbols when said apparatus is operably connected to a computer.

39. A method for encoding symbols into a computer, comprising:

a. providing a glance keypad, said glance keypad comprising:

a body, and a plurality of input-keys being disposed on said body, each said input-key having a plurality of actuators and a base, wherein each said actuator defines a touch location, each said touch location being located above said base in a spaced-apart relation to said base, each said touch location being tactilely distinct from each other said touch location and from said base, each of a plurality of fingers of a user being assigned to one of said input-keys, said plurality of input keys being within simultaneous operative reach of said plurality of said fingers of a user when a user's forearm is stationary with respect to said body, each said actuator defining two active states, said actuator being configured to actuate a first active state by a first glancing touch by a fingertip to said touch location in a first direction, each said actuator being configured to actuate a second active state by a second glancing touch of said fingertip to said touch location in a second direction, each said active state encoding a different symbol from a set of symbols when said glance pad is operably connected to a computer, said plurality of touch locations of each of said plurality of input keys defining a perimeter, a flexible resilient fence disposed about each said perimeter defining a plurality of fences, each said fence being upstanding above said base, each said fence being configured to provide a tactile feedback to said user to inform said user about where said user's finger is located with respect to each said touch location;

b. making a glancing touch to one of said plurality of said touch locations.

40. The method of claim 39 comprising:
a. selecting said symbol from said set of symbols;
b. selecting one of said touch locations corresponding to said selected symbol;
c. selecting one of said first and said second directions corresponding to said selected symbol;
d. perceiving a touch of said selected finger to said flexible resilient fence of said input-key assigned to said selected finger;
e. estimating a position of said selected finger with respect to said selected one of said touch locations;
f. making said glancing touch to said selected one of said touch locations in said selected direction.

41. An apparatus for encoding symbols into a computer, the apparatus comprising:
a. a base
b. a plurality of actuators
  i) each said actuator defining a touch location, each said touch location being located above said base in a spaced-apart relation to said base, each said touch location being tactilely distinct from each other said touch location and from said base;
  ii) said actuator defining only two active states, said actuator being configured to actuate a first active state by a first force exerted against said touch location in a first direction, said actuator being configured to actuate a second active state by a second force exerted against said touch location in a second direction, said second direction being substantially opposite to said first direction, said first and said second directions for each said actuator in combination defining a line of actuation of said actuator;
  iii) said base defining a plan view when viewed from above along a line generally orthogonal to said base, said lines of actuation of said plurality of actuators in combination defining a polygon in said plan view;
  iv) each said actuator being located so that a fingertip of a user can apply a first glancing touch in said first direction and a second glancing touch in said second direction to each said touch location when a forearm of said user supporting a hand to which said fingertip is attached is stationary with respect to said base, and wherein said first and said second glancing touches apply said first and said second force to said touch location;
  v) each said active state encoding a different symbol from a set of symbols when said apparatus is operably connected to a computer.
c. the apparatus further comprising a body, wherein said plurality of actuators and said base in combination define an input-key, the apparatus further comprising four of said input-keys disposed on said body so that a user's four fingers can each be located proximate to a respective input-key allowing each fingertip to actuate each respective input-key.

42. The apparatus of claim 41 wherein said apparatus further comprises a hand cover to envelop user's hand and protect the user's hand from cold and from the elements.

* * * * *